United States Patent
Gottin et al.

(10) Patent No.: US 11,513,961 B2
(45) Date of Patent: Nov. 29, 2022

(54) ONLINE HEURISTIC SEQUENTIALITY DETECTION OVER INPUT/OUTPUT STREAMS FOR CACHE SYSTEMS IN LARGE ADDRESS SPACES

(71) Applicant: EMC IP Holding Company LLC, Hopkinton, MA (US)

(72) Inventors: Vinicius Michel Gottin, Rio de Janeiro (BR); Tiago Salviano Calmon, Rio de Janeiro (BR); Paulo Abelha Ferreira, Rio de Janeiro (BR); Hugo de Oliveira Barbalho, Rio de Janeiro (BR); Rômulo Teixeira de Abreu Pinho, Niterói (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 189 days.

(21) Appl. No.: 17/161,252

(22) Filed: Jan. 28, 2021

(65) Prior Publication Data
US 2022/0237124 A1    Jul. 28, 2022

(51) Int. Cl.
*G06F 12/0862*    (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 9,529,722 B1* | 12/2016 | Tang | G06F 12/0862 |
| 9,886,385 B1* | 2/2018 | Huberty | G06F 12/0897 |
| 2003/0093621 A1* | 5/2003 | DeSota | G06F 12/0848 |
| | | | 711/E12.021 |
| 2005/0120183 A1* | 6/2005 | DeSota | G06F 12/082 |
| | | | 711/E12.027 |
| 2009/0006755 A1* | 1/2009 | Illikkal | G06F 12/0842 |
| | | | 711/E12.017 |
| 2016/0004642 A1* | 1/2016 | Sugimoto | G06F 3/06 |
| | | | 711/128 |
| 2021/0157593 A1* | 5/2021 | Gu | G06F 9/3802 |
| 2022/0043750 A1* | 2/2022 | Peterson | G06F 3/0655 |

* cited by examiner

*Primary Examiner* — William E. Baughman
(74) *Attorney, Agent, or Firm* — Chamberlain, Hrdlicka, White, Williams & Aughtry

(57) ABSTRACT

A method and system for assessing sequentiality of a data stream is disclosed. Specifically, the method and system disclosed herein may entail receiving an incoming request to access a page in a cache memory, wherein the page is identified by a page address of an address space in a main memory; identifying, in a memory, a bin corresponding to an address range including the page address of the page of the incoming request, wherein the bin includes k address ranges of the address space of the main memory; determining whether to update an occupation count of the bin in the memory; locating the bin in a heuristics table to obtain an estimated total number of expected proximal accesses based on an updated occupation count of the bin; and determining, based on the estimated total number of expected proximal accesses, sequentiality of the data stream to device in order to generate a policy for the cache memory.

20 Claims, 13 Drawing Sheets

ONLINE HEURISTIC SEQUENTIALITY DETECTION OVER INPUT/OUTPUT STREAMS FOR CACHE SYSTEMS IN LARGE ADDRESS SPACES

BACKGROUND

Cache management systems seek to optimize cache memory efficiency and cache memory performance in various manners. Cache policies (e.g., pre-fetch and promotion) are generally designed to target improving utilization of cache memory and therefore its efficiency.

Implementing cache policies in real-time can be key to achieving effective cache memory performance outcomes. For example, unless updated in real-time, pre-fetch policies may face difficulty keeping up with the rate of read and write requests to a cache memory. While typically not impacted as severely, cache promotion policies can also be susceptible to real-time updates.

Moreover, cache management policies can introduce overhead that consumes valuable system resources (e.g., memory). In some cases, the larger the address space windowed by the cache memory, the greater the resources required for maintaining the overhead information related to cache management and cache optimization. Accordingly, for large-sized address spaces, in particular, current approaches become increasingly inefficient. Multi-tiered cache systems can further add to overhead requirements, as discussed above.

SUMMARY

In general, in one aspect, the invention relates to a method for performing assessing sequentiality of a data stream. The method includes receiving an incoming request to access a page in a cache memory, wherein the page is identified by a page address of an address space in a main memory; identifying, in a memory, a bin corresponding to an address range including the page address of the page of the incoming request, wherein the bin includes k address ranges of the address space of the main memory; determining whether to update an occupation count of the bin in the memory; locating the bin in a heuristics table to obtain an estimated total number of expected proximal accesses based on an updated occupation count of the bin; and determining, based on the estimated total number of expected proximal accesses, sequentiality of the data stream to device in order to generate a policy for the cache memory.

In general, in one aspect, the invention relates to a device including a processor and memory comprising instructions which, when executed by the processor, perform assessing sequentiality of a data stream by receiving an incoming request to access a page in a cache memory, wherein the page is identified by a page address of an address space in a main memory; identifying, in a memory, a bin corresponding to an address range including the page address of the page of the incoming request, wherein the bin includes k address ranges of the address space of the main memory; determining whether to update an occupation count of the bin in the memory; locating the bin in a heuristics table to obtain an estimated total number of expected proximal accesses based on an updated occupation count of the bin; and determining, based on the estimated total number of expected proximal accesses, sequentiality of the data stream to device in order to generate a policy for the cache memory.

In general, in one aspect, the invention relates to the invention relates to a non-transitory computer readable medium comprising computer readable program code, which when executed by a computer processor enables the computer processor to perform a method for assessing sequentiality of a data stream. The method includes receiving an incoming request to access a page in a cache memory, wherein the page is identified by a page address of an address space in a main memory; identifying, in a memory, a bin corresponding to an address range including the page address of the page of the incoming request, wherein the bin includes k address ranges of the address space of the main memory; determining whether to update an occupation count of the bin in the memory; locating the bin in a heuristics table to obtain an estimated total number of expected proximal accesses based on an updated occupation count of the bin; and determining, based on the estimated total number of expected proximal accesses, sequentiality of the data stream to device in order to generate a policy for the cache memory.

DETAILED DESCRIPTION

Figure 1:
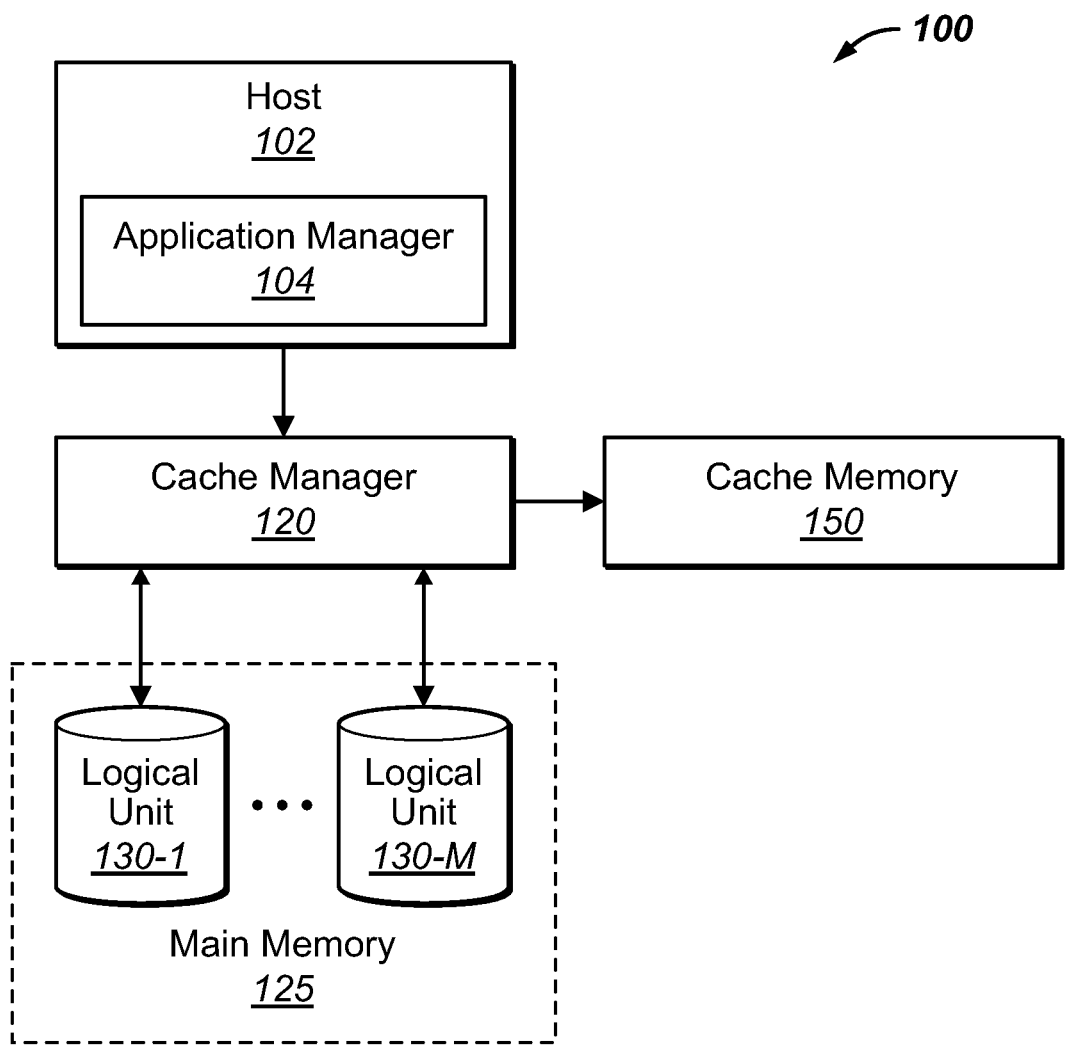
FIG. 1 shows an example system in accordance with one or more embodiments of the invention described herein.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Online sequentiality detection over data input/output (I/O) streams ultimately destined for main memory storage, particularly for cache systems operating in large main memory address space environments, can be a challenging feat. The large main memory address space nearly precludes keeping up with data read and write requests to a cache memory of the system to perform reliable sequentiality calculations in real-time. Accordingly, cache policies that rely on or leverage the sequentiality assessment of the workload cannot be implemented online without significant efficiency loss.

More specifically, sequentiality of a workload can be key to cache management and optimization. A workload is a data stream (or trace) of requests from inputs/outputs (Is/Os) of a system (e.g., storage system) to perform a certain action.

For example, a data stream may be reflective of a request to read data from or write data to a storage device. Managing and optimizing policies of a cache memory, while an effective endeavor, may burden the system with constrained system resources. In a large enough address space, cache memory management and optimization may not only prove to be a daunting task, they are likely to defeat the purpose of using cache memory given the number of requisite resources, such as the overhead information associated with maintaining the cache memory. Real-time processing and multi-tiered cache systems can have a compounding effect on the foregoing issues.

But when an address space of a main memory, cached by a cache memory, tiered or not, is divided into a series of page address ranges and the cache memory is managed based on the series of address ranges, the amount of overhead space can be minimized, at least reduced, and manageable even for real-time cache management and optimization. Further, an online heuristic sequentiality detection method can not only provide reliable sequentiality determinations over a data I/O stream, it can enable speedy sequentiality determinations, at least fast enough to keep up with cache memory requests. Moreover, windowing of a large-sized main memory address space by the cache memory is made efficient because the overhead associated with implementing the sequentiality determination is minimal, occupying memory space of more than tolerable sizes. Online heuristic sequentiality detection for multi-tiered cache systems is no different.

Sequentiality typically focuses on the locality of data. Consider distance, represented by the letter "d", to be the distance between the location of a page of data in a given address space relative to the location of a sequential neighboring page of data in the same address space. In one or more embodiments of the invention, the temporality of page accesses may be employed in combination with the locality of data to realize a real-time sequentiality assessment of the workload. The temporality of page accesses is the distance between sequential page accesses in a workload even if the accesses are apart in time. For example, a sequential page access received by a cache memory, even if received after receiving a number of intermediate non-sequential page accesses, may be considered sequential so long as the sequential page access is reasonably close in time to the corresponding sequential page accesses preceding the intermedial non-sequential page accesses. Additionally, the range of addresses of the page accesses (locality) should be reasonably close to allow for the combination of locality and temporal accesses to present an accurate enough estimation of sequentiality of a workload for the purposes of management and optimization of a cache system.

On a per-request basis, sequentiality of information for a cache policy, such as a cache prefetching policy, may be estimated. The cache prefetching policy is not influenced by prefetched pages admitted to the cache and is therefore policy agnostic. For example, any cache policy management for cache segmentation, eviction, or pre-fetching that allows for the monitoring of admissions and evictions may be employed without regard to prefetched pages admitted to the cache.

Consider the case where an address space of a main memory has "P" number of pages where "P" represents an integer value and the address space is divided into bins with each bin having "k" number of ranges of page addresses of the pages of the address space wherein "k" represents an integer value. An address space of 1,000 pages may be divided into ten bins where each bin has ten-page address ranges. Maintaining ten bins requires considerably less overhead than maintaining 1,000 pages. A manager of a corresponding cache memory need merely keep track of the k bins rather than the P pages of the address space. A "page" refers to a minimum addressing unit (e.g., 8 kilo bytes (KB), 64 KB or 128 KB) in a cache memory or a main memory. The size of a page may be defined in terms of blocks per page although it need not be. A block is an addressable unit comprising one or more bytes (e.g., 512 bytes).

Real-time updates of the bins renders possible to realize affective cache management and optimization policies, such as a pre-fetch policy, because the speed of the bin updates can keep up with the rate of incoming read and write requests to the cache memory, particularly given an appropriate bin size, which may be a matter of design choice and based on the address space size. Updates to the bins reflect occupation count updates and eviction count updates to a corresponding cache memory. With each update, the bin count is cross referenced with a heuristics table to obtain an estimate used to determine the sequentiality of the address space workload based on the updated bin count. The heuristics table may be determined and saved in local memory prior to receiving incoming requests to the cache memory. The bin count is effectively a measure of the longevity of a page in the cache memory while the page continues to reside in the cache memory. Incoming requests may lead to evictions. Incoming requests as well as evictions may factor into the bin count but not all requests result in a change to the bin count and not all evictions result in a change to the bin count.

As earlier noted, sequentiality assessment may be performed in real-time based on a heuristics table. The heuristics table is populated with an estimated sequentiality value based on the counts of the cache memory accesses of an address space in a memory-efficient manner. The heuristics table may be updated for each workload and in a policy-agnostic manner. The contents of the heuristics table reflect the temporality of the cache memory access requests in that an expected number of proximal accesses has a fixed bin size, k, and a maximum allowed gap, $\delta$, between sequences of page addresses. Stated differently, $\delta$ may determine whether requests for two pages comprise a sequential access pattern. Two pages that are at most $\delta$ pages apart are presumed to be proximal. The heuristics table may be viewed as an expected number of proximal accesses determined for a bin of size k with the bin having an occupancy count, represented by "c" where "c" is an integer value. In this respect, the heuristics table includes expected proximal accesses to the cache memory based on locality and temporality aspects of page access for a predetermined value of k and all possible values of an occupation count for a given bin. In some cases, heuristics table may be derived from an expected or estimated sequentiality function, further discussed below.

Various embodiments of the invention are described below.

FIG. 1 illustrates an exemplary storage environment (100), according to one or more embodiments of the invention. As shown in FIG. 1, the storage environment (100) includes a cache manager (120) communicatively coupled to a host (102), a main memory (125), and a cache memory (150). The host (102) includes an application manager (104) with functionality to execute one or more applications (not shown) executing on the host (120) and transmitting application requests to the cache manager (120). The main memory (125) includes one or more logical units (130-1) through (130-M) of memory. In further variations, physical storage units can be employed in the main memory (125) in addition to, or instead of, the logical units (130) shown in FIG. 1. Likewise, while one or more exemplary embodiments refer to logical addresses, physical addresses can also be employed, as would be apparent to a person of ordinary skill in the art. Each of the aforementioned components is described below.

In an embodiment of the invention, the cache manager (120) includes functionally to receive, from the application manager (104) executing on the host (102), one or more application requests generated by one or more applications also executing on the host (102), and to process the application request. For example, for an application request at a certain memory address location, Aj, the cache manager (120) retrieves the content of that location (Aj). The cache manager (120) may also retrieve the content of the N next address locations, {A+1, . . . , Aj+x}, before the application actually requests the content from the N next address locations. The cache manager 120 may retrieve the content of the N next address locations when retrieving the content of the intended location, Aj, as a part of a cache pre-fetching policy to improve the efficiency of utilization of the cache memory (150). Stated differently, content from the N next address locations is anticipated content by the cache manager (120). In this respect, the cache manager (120) places the retrieved content from location Aj as well as the retrieved content from the N next address locations in the cache memory (150) ready for accessing.

In a non-limiting example, the cache manager (120) may process the application requests from the host (102) by making one or more sequentiality determinations, in real-time, of requests (e.g., read and write) for the content of a cache memory (e.g., 150) to assist in devising an effective cache memory policy with minimal resource consumption even for a main memory with a large-sized address space.

In some embodiments of the invention, temporality aspects of cache memory accesses to the cache memory (150) is based on the lifetime of pages in the cache memory (150). As earlier discussed, sequential accesses to the cache memory (150) are intended to be used for management and optimization of cache policies. Accordingly, without loss of generality, an assumption is made that as long as two pages of a given address space are stored in the cache memory (150), they are considered close enough, or reasonably close, in time to compose a sequence. Further assumed herein, without loss of generality, is that requests for more than one page is a sequence of requests of a single page.

The lifetime of a page in the cache memory (150) is considered the duration of time in which the page resides in the cache memory (150) before the page is evicted from the cache memory (150). Because most policies are triggered by the processing of a request, the lifetime of a page in the cache memory is presumed measured by one or more requests. In some embodiments, assuming a range of contiguous addresses a, a+1, . . . , a+n, where "a" represents a page address and "n" represents an integer value, if page "a" previously requested and admitted into the cache memory is evicted, the subsequent request and admission into the cache memory of page "a+1" is not considered a "sequence" with respect to the range of addresses a, a+1, . . . , a+n, regardless of the value of δ, due to a difference in temporality as corresponding to the lifetime of the pages in the cache. In some embodiments of the invention, other approaches for an accounting of the lifetime of requests may be implement.

In one embodiment of the invention, the cache manager (120) is a physical or virtual device that may be used for performing various embodiments of the invention, see e.g., FIGS. 2, 3A and 3B, and 4-11C. The physical device may correspond to any physical system with functionality to implement one or more embodiments of the invention. For example, the physical device may be a device or a part of or incorporated in the cache memory (150) with at least one or more processor(s) and memory. Another embodiment of the physical device is the computing device shown in FIG. 12

Alternatively, the physical device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, the cache manager (120) includes executable instructions (stored in a non-transitory computer readable medium (not shown)), which when executed by a processor(s), enable the cache manager (120) to perform one or more methods described below (see e.g., FIGS. 2, 3A and 3B, and 4-11C).

In one embodiment of the invention, the cache memory (150) is a physical device that includes fast memory relative to the memory of the main memory (125). In a non-limiting example, the cache memory (150) may be implemented in non-persistent memory, such as volatile memory (e.g., random access memory (RAM), dynamic RAM). The cache memory (150) may be implemented in non-volatile memory (e.g., FLASH memory). The cache memory (15) may yet be implemented in a shared memory spanning across multiple logical units (LUNs). The LUNs may be logical subdivisions of a storage system (e.g., main memory 150), each with a distinct addressable space identified by logical block addresses (LBAs). Cache memory (150) may have a tiering structure and/or segmentation features, not. In scenarios with a layered cache memory structure, each layer of the cache memory may be implemented in volatile, non-volatile, or shared memory, as discussed above.

In one embodiment of the invention, the main memory (125) is a physical device that includes persistent storage. In a non-limiting example, the main memory (125) may be non-volatile memory (e.g., solid state memory).

An example of a main memory and a cache memory includes, but not limited to, a storage system with cache memory where the storage system includes storage with main memory having an address space spanning an address space size (e.g., "P" pages) and the cache memory for caching read and write requests to the main memory. The main memory and cache memory are not limited to the aforementioned specific examples. Different types of main memory and cache memory are contemplated.

In an embodiment of the invention, the host (102) may be one or more computing devices functionally equipped to execute one or more applications and an application manager (e.g., application manager (104)), and to send application requests, through the application manager (104) to the cache manager (120) for reading content from the cache memory (150) and writing content to the cache memory (150).

In one embodiment of the invention, the host (102) is a physical or virtual device that may be used for performing various embodiments of the invention. The physical device may correspond to any physical system with functionality to implement one or more embodiments of the invention. For example, the physical device may be a device with at least one or more processor(s), memory, and an operating system that executes one or more applications and the application manager (104).

Alternatively, the physical device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, the host (102) includes executable instructions (stored in a non-transitory computer readable medium (not shown)), which when executed, enable the host (102) to perform one or more functions disclosed herein.

One skilled in the art will recognize that the architecture of the storage system environment (100) is not limited to the components shown in FIG. 1. For example, the storage system (100) may each include components not shown in FIG. 1 or include alternate or fewer components as those shown in FIG. 1. In another example, while FIG. 1 shows the cache manager (120) and the cache memory (150) as separate devices, the cache manager (120) may be incorporated in or a part of cache memory (150). In such scenarios, the cache manager (120) may process application requests to the cache memory (150) at a faster speed given faster access times to locations of the cache memory (150). Further, the cache manager (120) may be coupled to more than one host where each host includes a corresponding application manager and executes corresponding one or more applications.

Figure 2:
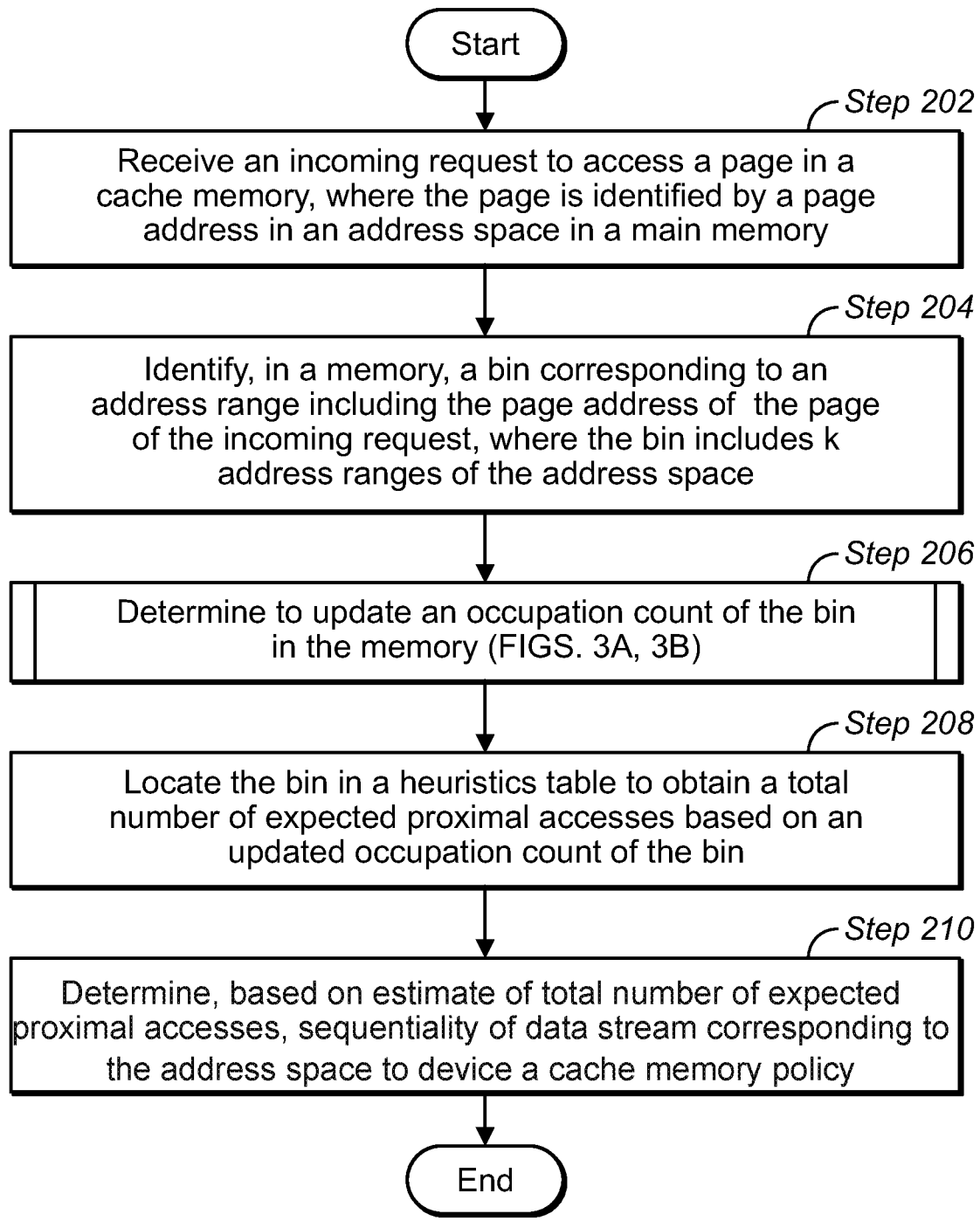
FIG. 2 shows a flowchart describing a method for determining sequentiality of a data stream to a cache memory in accordance with one or more embodiments of the invention disclosed herein.

FIG. 2 shows a flowchart describing a method for determining sequentiality of a data stream (content) to a cache memory (e.g., 150, FIG. 1), in accordance with one or more embodiments described herein. The method of FIG. 2 may be performed by, for example, a cache manager (e.g., 120, FIG. 1). Other components illustrated in FIG. 1 may perform or assist in performing the method of FIG. 2 without departing from the invention. Further, one or more steps in FIG. 2 may be performed concurrently with one or more steps of the flow charts of FIGS. 3A and 3B.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

For the purpose of illustration, the steps of FIG. 2 are presumed performed by the cache manager (120) of FIG. 1 in the discussion to follow. In step 202, an incoming request to access a page of a main memory (e.g., 125, FIG. 1) is received by the cache manager (120). In the embodiments described below, a page is identified by a page address of an address space of the main memory. In some embodiments of the invention, an addressing space of each LUN (or address space) is divided into equal-sized ranges of contiguous addresses. The addressing space is represented by the letter "P" of a LUN in the system. In some embodiments of the invention, the size of the address space may not be divisible by k, in such scenarios, the last of these page address ranges is virtually padded with a predetermined value, such as "1" or "0", in binary notation. In the embodiments to follow, for the purpose of simplicity of illustration, the last range of addresses is presumed to include k addresses even if some of the corresponding page addresses are not valid addresses in the system and will not be requested.

In step 204, the cache manager (120) identifies a bin, in a memory, corresponding to an address range including the page address of the page of the incoming request of step 202. The address range is a part of the address space of a main memory (e.g., 125, FIG. 1). In an embodiment of the invention, the identified bin is a part of or incorporated into a cache memory (e.g., 150, FIG. 1) but the identified bin need not be a part of the cache memory and can instead reside externally to the cache memory. In an embodiment of the invention, the identified bin may be a part of or incorporated in a main memory (e.g., 125, FIG. 1), but the identified bin need not be a part of the main memory and can instead reside externally to the main memory. The bin includes k page address ranges of the address space where "k" is an integer value.

In step 206, the cache manager (120) determines to update an occupation count of the bin in the memory where the bin is located. In an embodiment of the invention, the cache manager (120) determines to update an occupation count of the bin in the memory where the bin is located in accordance with the processes of FIGS. 3A and 3B discussed below. In an embodiment of the invention, the occupation count of the bin may be updated each time an application request is received from a host (e.g., 102, FIG. 1). In some embodiments of the invention, the occupation count of the bin may be updated periodically. The occupation count of the bin is a count of the number of page address ranges of the k address ranges with occupied pages, i.e., pages currently residing in the cache memory.

In step 208, the bin is located in a heuristics table to obtain a total number of expected proximal accesses based on an updated occupation count of the bin. Stated differently, the updated occupation count of the bin is cross-referenced with the heuristics table to obtain the total number of expected proximal accesses. In accordance with an embodiment of the invention, the heuristics table is maintained in persistent memory. For example, the heuristics table may be a part of a main memory (e.g., 125, FIG. 1). The heuristics table need not be a part of the main memory and may be maintained in a memory externally located to the main memory. In some embodiments, the heuristics table is maintained in non-persistent memory.

The total number of expected proximal accesses is an estimate of the total number of proximal accesses in an entire address space serviced by a cache memory (e.g., 150, FIG. 1). For example, a pair of application requests is considered to have a proximal access if the distance between the page addresses of the requested pages of the pair of requests is close enough to characterize a sequential pattern relative to the pair's corresponding page addresses in a cache memory. For example, a sequential pattern may be based on two adjacently positioned pages in cache memory with no intermediate page occupying a position between the two pages. Assuming the following three pages: p1, p2, and p3 have the following relationship: p1<p2<p3, where p2 is at a page address higher than the page address of p1, and p3 is at a page address higher than the page address of p1 and the page address of p2, and p2 is positioned between p1 and p3 in the cache memory, the maximum number of proximal accesses of the three pages is limited to two; one potential proximal access between p1 and p2 and a second potential proximal access between p2 and p3. Because page p2 is between p1 and p3, there is no proximal access considered between p1 and p3. That is, there is an intermediate page, p2, between p1 and p3 in cache memory that prevents the proximal access between these two pages to be counted.

In step 210, the cache manager (120) determines, based on an estimate of the total number of expected proximal accesses, the sequentiality of a data stream corresponding to the address space of the main memory (e.g., 125, FIG. 1). The sequentiality of a data stream is then used to determine or influence a policy for a corresponding cache memory (e.g., 150, FIG. 1). For example, the determination of a large sequentiality of a current data stream may be used to determine that an aggressive prefetching policy, which is known to exploit sequentiality efficiently, should replace a current policy in place. Alternatively, a currently in-place policy can be parametrized to better exploit large sequentiality. Conversely, if the current data stream presents nearly no sequentiality, a currently in-place policy could be parametrized for conservative prefetching (and minimal cache pollution). The sequentiality of a current stream may also be used to determine other kinds of changes in policies, including related to promotion of content across cache tiers, scoring of cache policies, and optimization of throughput of memory access requests.

Figure 3A:
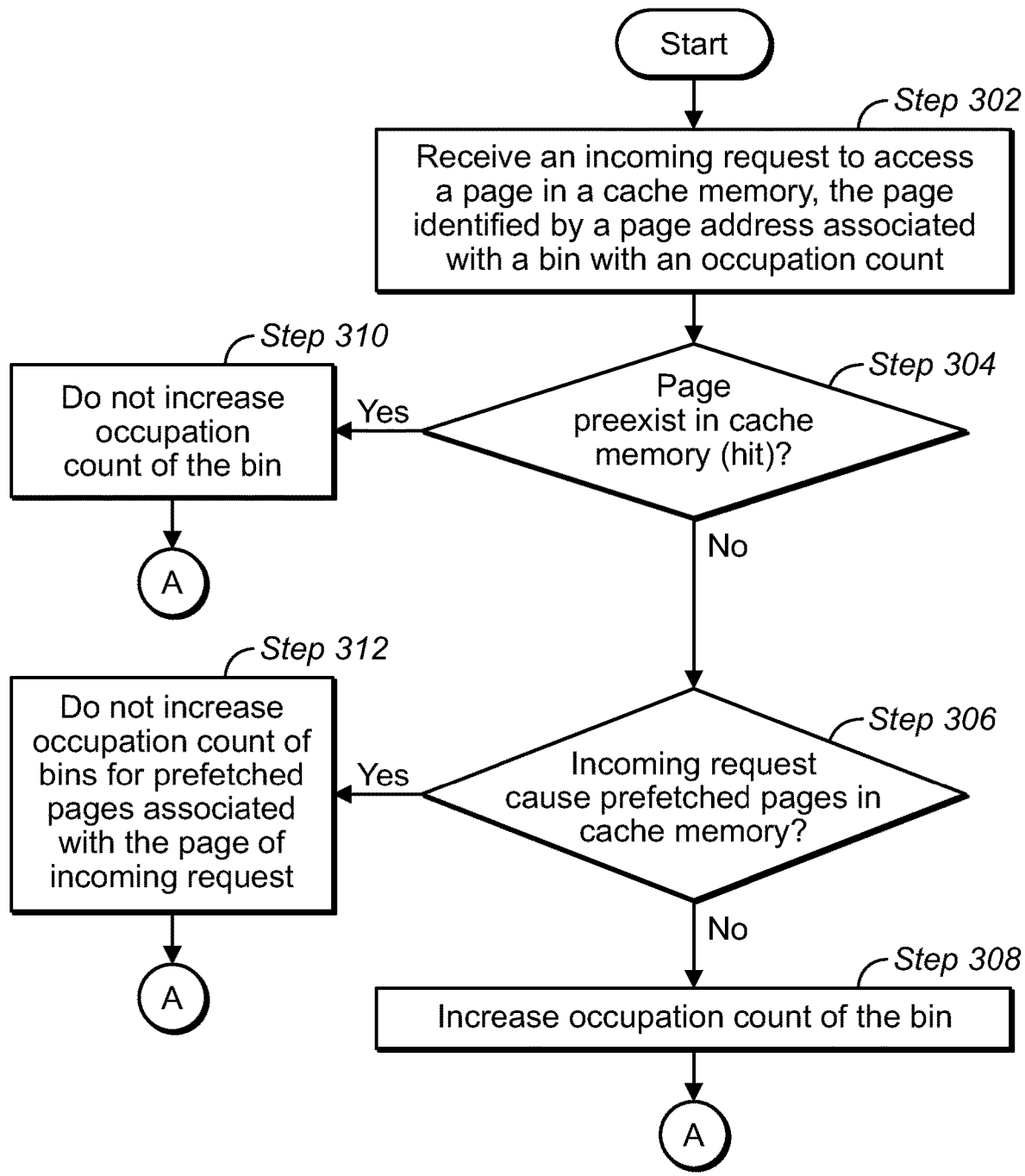
FIG. 3A shows a flowchart describing a method for determining to increase, or not, an occupation count of a bin in accordance with one or more embodiments of the invention disclosed herein.
Figure 3B:
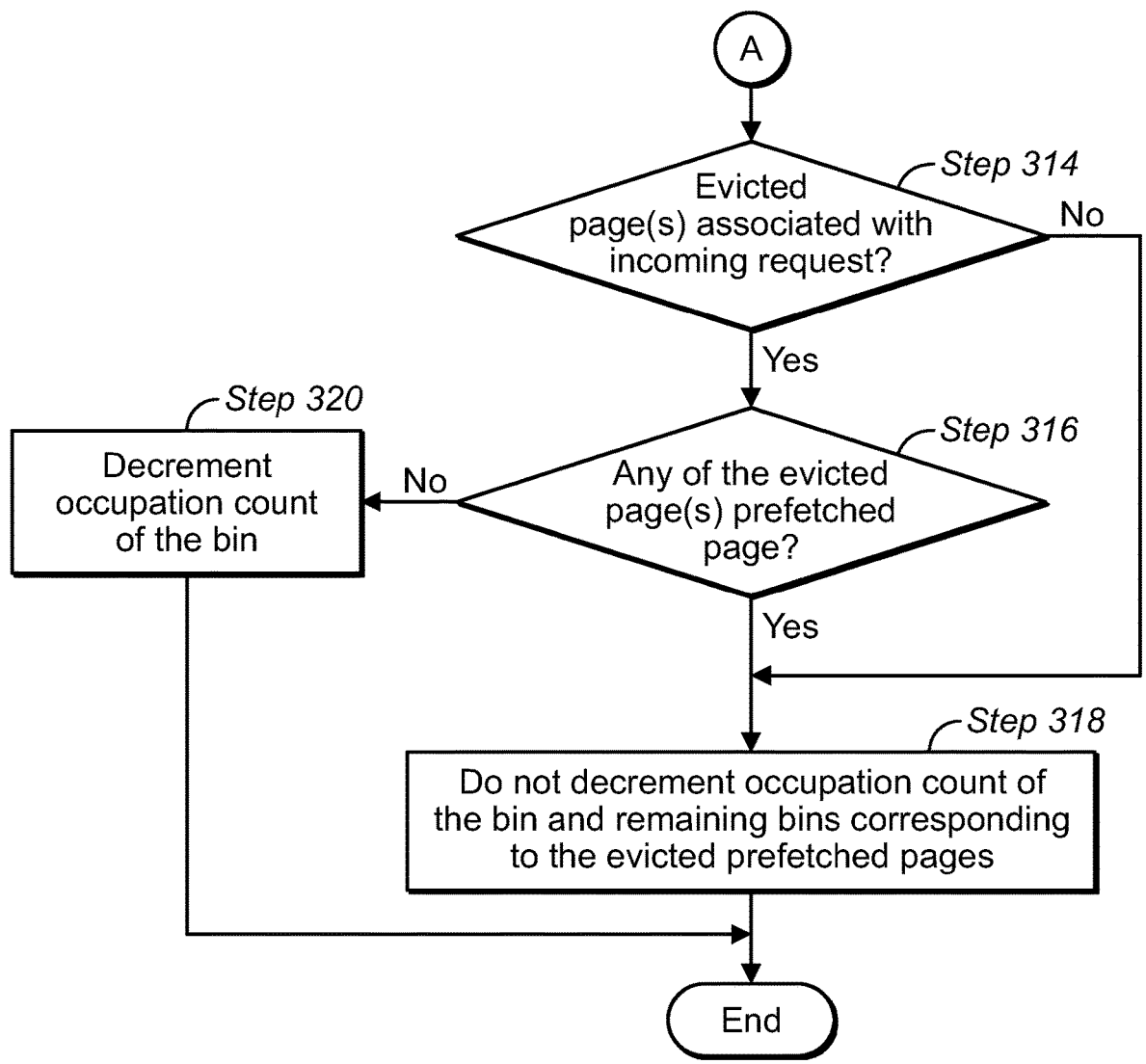
FIG. 3B shows a flowchart describing a method for determining to decrease, or not, an occupation count of a bin in accordance with one or more embodiments of the invention disclosed herein.

FIGS. 3A and 3B show flowcharts describing a method of updating an occupation count of a bin in accordance with one or more embodiments described herein. In an example process, FIGS. 3A and 3B may be applied to step 206 of the flowchart of FIG. 2 to determine whether or not to update the occupation count of a bin. More specifically, FIG. 3A shows a flowchart describing a method for determining to increase, or not, an occupation count of a bin in response to an incoming request in accordance with one or more embodiments described herein. FIG. 3B shows a flowchart describing a method for determining to decrease, or not, an occupation count of a bin in response to an incoming request in accordance with one or more embodiments described herein. The steps of FIGS. 3A and 3B may be performed by, for example, a cache manager (e.g., 120, FIG. 1). Other components illustrated in FIG. 1 may perform or assist in performing the methods of FIGS. 3A and 3B without departing from the invention. Further, one or more steps in FIGS. 3A and 3B may be performed concurrently with one or more steps of the flow charts of FIG. 2.

While the various steps in the flowcharts shown in FIGS. 3A and 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

While the various steps in the flowcharts shown in FIGS. 3A and 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

For the purpose of illustration, the steps of FIGS. 3A and 3B are presumed performed by the cache manager (120) of FIG. 1 in the discussion of FIGS. 3A and 3B to follow. With reference to FIG. 3A, in step 302, the cache manager 120 receives an incoming request to access a page in a cache memory (e.g., 150, FIG. 1). The page is identified in a main memory (e.g., 125, FIG. 1) by a page address associated with a bin of a range of page addresses that includes the page address. The bin has an occupation count, represented by the letter "c", that is the number of pages residing in the cache memory (150).

At step 304, the cache manager (120) makes a determination as to whether or not the page already exists in the cache memory (150) and in the case where the page is determined to preexist in the cache memory (150), the cache manager (120) proceeds to performing step 310. Otherwise, in the case where the page is determined not to preexist in the cache memory (150), the cache manager (120) proceeds to performing step 306. At step 310, the occupation count of the bin is not increased.

At step 306, the cache manager (120) makes a determination as to whether or not the incoming request, received at step 302, causes prefetched pages to be stored in the cache memory (150). For example, an incoming request for a page that is not already stored in the cache memory (150) may cause a certain number of sequentially neighboring pages to be fetched from a main memory (e.g., 125, FIG. 1) in anticipation of the incoming request resulting in accessing the sequential neighboring pages. In the case where the cache manager (120) determines that the incoming request causes prefetched pages to be stored in the cache memory (150), the cache manager (120) proceeds to step 312, otherwise, the cache manager (120) determines that the incoming request does not cause prefetched pages to be stored in the cache memory (150) and the cache manager (120) proceeds to step 308.

At step 312, the cache manager (120) does not increase the occupation count of the bin to account for the prefetched pages, whereas, in step 308, the cache manager (120) increases the occupation count of the bin by the number of prefetched pages. Upon completion of each of the steps 308, 310, and 312, in FIG. 3A, the cache manager (120) proceeds to step 314, shown in FIG. 3B, to determine whether or not to account for evicted pages.

With reference to FIG. 3B, in step 314, the cache manager (120) makes a determination as to whether or not one or more pages are evicted from the cache memory (150) in association with the incoming request of step 302 of FIG. 3A. In a non-limiting example, if the cache memory implements a least-recently used (LRU) algorithm, particularly when the cache memory is full, each time a request is received and a page is added to the cache memory, a page is evicted from the cache memory. It is understood that embodiments disclosed herein are not limited to use with a LRU-based cache memory and the cache memory may be based on other algorithms, such as, without limitation, most-recently used (MRU).

If, at step 312, the cache manager (120) determines that the one or more pages are evicted from the cache memory (150) in association with the incoming request of step 302

(FIG. 3A), the cache manager (120) proceeds to step 316. Otherwise, if the cache manager (120) determines that the one or more pages are not evicted from the cache memory (150) in association with the incoming request of step 302 (FIG. 3A), the cache manager (120) proceeds to step 318. At step 318, the occupation count of the bin corresponding to the incoming request of step 302 (FIG. 3A) is not decremented. Further, the occupation count of the bin corresponding to any sequential, neighboring pages of the page of the incoming request that correspond to evicted prefetched pages is not decremented.

At step 316, the cache manager (150) makes a determination as to whether or not the evicted page(s) are prefetched pages. In response to a determination that the evicted page(s) are prefetched pages, the cache manager (150) proceeds to step 318 and in response to a determination that the evicted page(s) are not prefetched pages, the cache manager (150) proceeds to step 320. At step 320, the occupation count of the bin associated with the incoming request is decremented by the number of prefetched pages. The process ends after the completion of steps 318 and 320.

The following section describes non-limiting examples in accordance with one or more embodiments of the invention. In some embodiments of the invention, the processes of FIGS. 2-3B are used to implement the different sets of incoming page accesses of the examples of the following section.

Turning to the example, in FIGS. 4-11C, the address space of a main memory (e.g., 125, FIG. 1), is represented by "P" and the number of page address ranges in a bin is represented by "k" and presumed to be 8. Accordingly, the number of bins in the P address space is a function of the number of pages in the address space, P, and the number of page address ranges in a bin, k, or P/k, is represented by the letter "x". The bins are in the order of sequential and adjacent page address ranges. For example, bin 0 corresponds to the first 8 address ranges (e.g., 0000 bytes, in hexadecimal notation, where a bin is byte-wide, through 00FF, in hexadecimal notation), bin 1 corresponds to the next 8 address ranges (e.g., 0100 through 01FF, following the example above), and bin 2 corresponds to the following 8 address ranges (e.g., 1000 through 1FFF, following the example above), and so on. Further, the cache memory is presumed to implement a LRU algorithm. It is understood that the cache memory may implement one or more algorithms other than the LRU algorithm.

Figure 4:
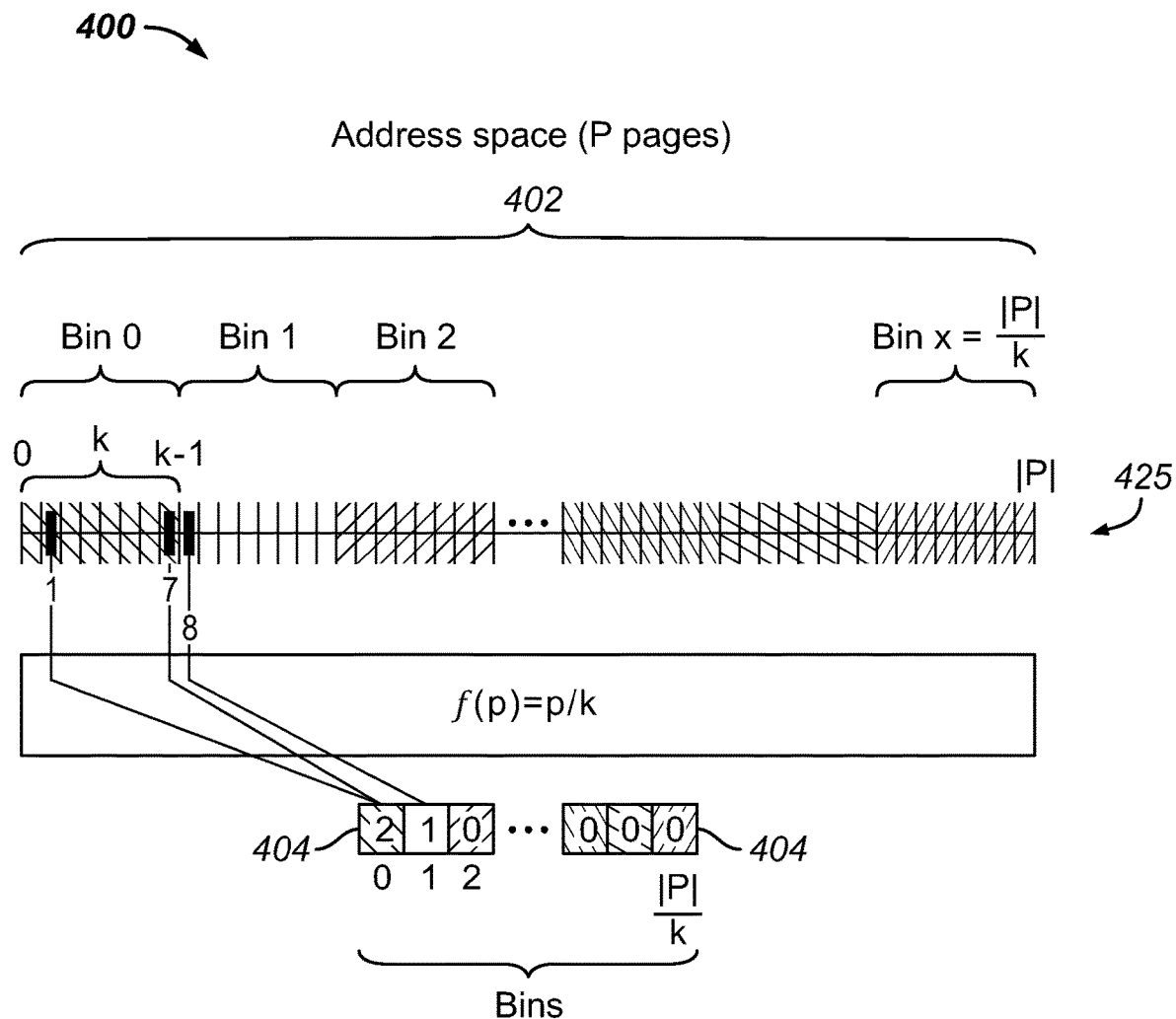
FIGS. 4-11C show examples in accordance with one or more embodiments of the invention.

In the example of FIG. 4, the cache system (400) is shown to include P number of pages spanning across an address space (402). The address space (402) of the cache system (400) includes P number of page addresses (425). The page addresses (425) are divided into x number of bins. The number of bins is a function of the number of page address ranges, k, in each bin. In general, the greater the number of page address ranges, k, in each bin, the fewer the number of bins. Given a common cache memory size, a larger address space may be divided into bins with a higher number of page address ranges, k, whereas a smaller address space may be divided into bins with fewer number of page address ranges, k. A large address space with small bin sizes may result in a large number of bins such that even with a sparse representation the memory overhead for keeping the bin structure may be significant. On the other hand, larger bin sizes add increasing uncertainty to the heuristic, even for small address spaces. In this respect, the bin size may be a design choice. Determining the bin size may take into account other factors.

Each of the bins, 0, 1, 2, . . . , P/k, is shown to include an associated occupation count (404). For example, bin 0 is shown to include an occupation count 2, bin 1 is shown to include an occupation count 1, bin 2 is shown to include an occupation count 0, and the remaining bins each include an occupation count 0. The occupation counts (404) of the bins correspond to the state of cache memory. For example, as shown in FIG. 4, the second page address range and the last page address range of bin 0 are shown to reside in cache memory, otherwise, bin 0 has no other page address ranges in the cache memory. Accordingly, bin 0 has an occupation count of 2. The first page address range of bin 1 is shown to reside in cache memory, otherwise, bin 1 has no other page address ranges in the cache memory. Accordingly, bin 1 has an occupation count of 1. None of the remaining page address ranges of address space P are found in the cache memory, accordingly, the bin counts for the corresponding bins are all 0.

Each of the examples of FIGS. 5A, 6A, 7A, 8A, 9A, and 10A includes a legend of the status of corresponding requests to the cache memory. For example, a symbol in the legend that is an encircled letter "p" that is not filled in is shown to represent a requested page that is a hit in the corresponding cache memory, a symbol with "p" in a square that is not filled in represents a requested page that is a miss in the corresponding cache memory, a symbol with "p" enclosed with a dashed square represents an evicted page, and so on.

Figure 5A:
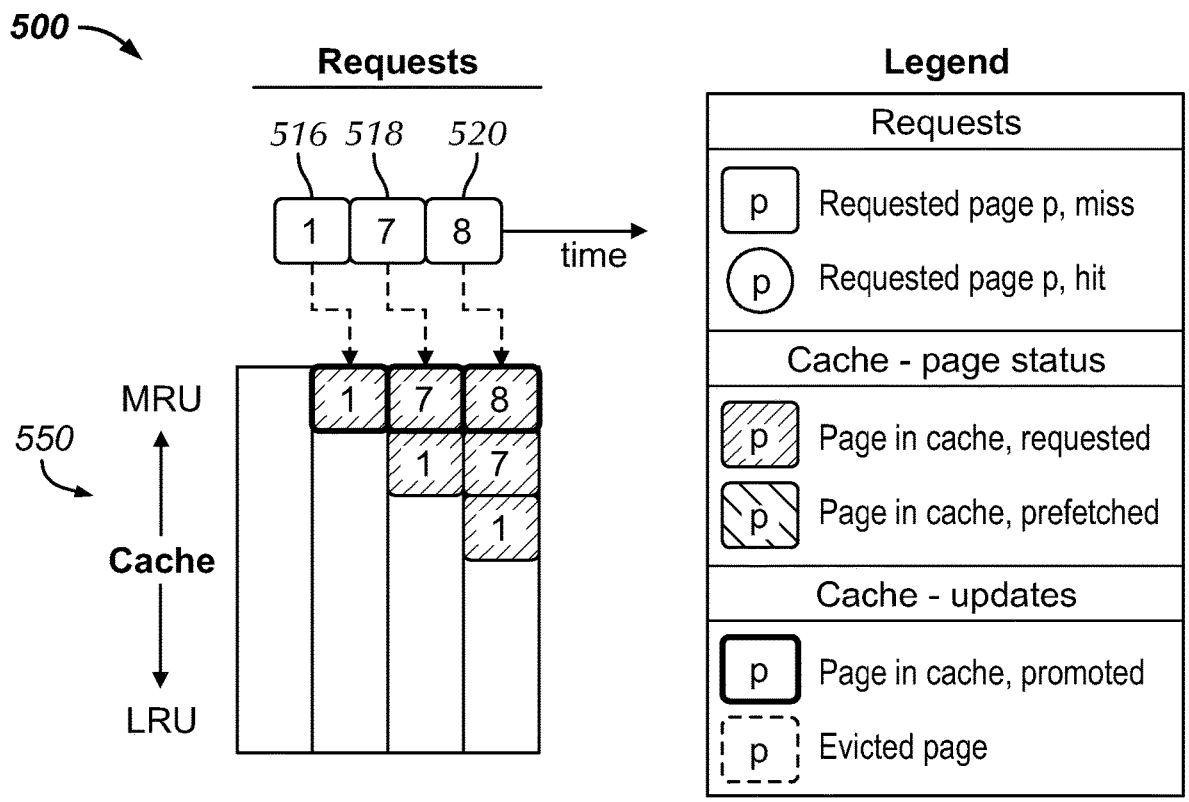
Figure 5B:
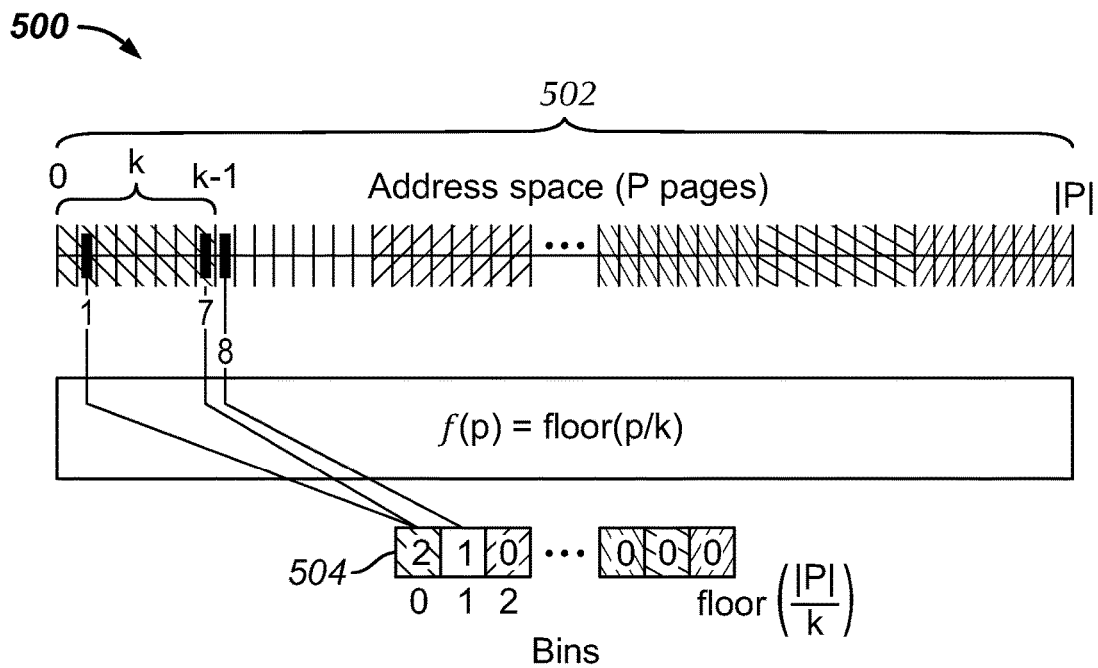

In FIG. 5A, a cache system (500) is shown to include a cache memory (550) and three incoming requests 516-520. FIG. 5B shows an address space (502) of the cache system (500) that corresponds to the cache memory (550) of FIG. 5A. Accordingly, FIGS. 5A and 5B are discussed together below.

In FIGS. 5A and 5B, the incoming requests (516)-(520) are received by the cache memory (550) in the order of (516), (518), and (520), with request (516) arriving first, following by request (518), and followed by request (520). Each of the three incoming requests (516)-(520) is associated with a page, "1", "7", and "8", respectively, not currently stored in the cache memory (550). None of these pages preexist in the cache memory (550). Two of the requests are associated with pages, pages 1 and 7, that fall in bin 0 and the third request is associated with a page, page 8, that falls in bin 1. Accordingly, the occupation count (504) of bins 0, 1 are updated. The occupation count (504) for bin 0 is updated to "2" to account for the corresponding incoming pages 1, 7, and the occupation count (504) for bin 1 is updated to "1" to account for the one corresponding incoming page 8. In FIGS. 5A and 5B, no page is evicted from the cache memory (550) because the cache memory (550) is not completely full.

Figure 6A:
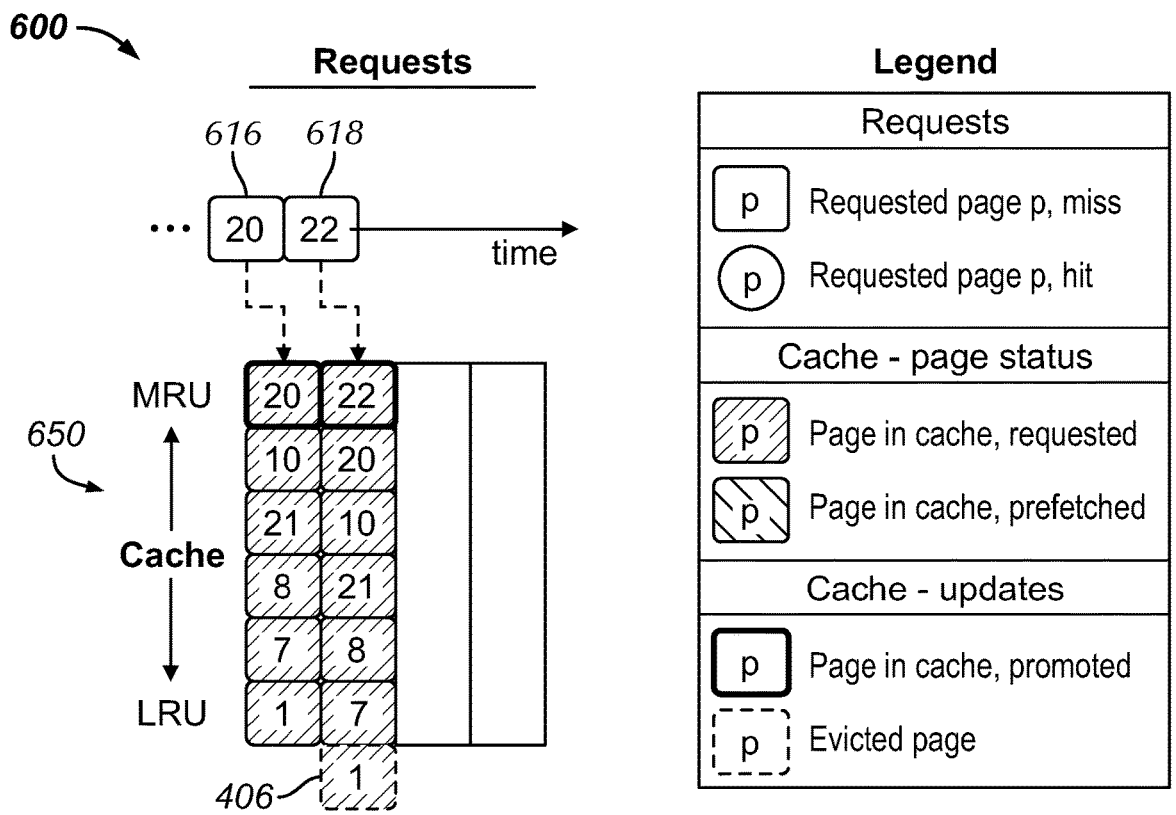
Figure 6B:
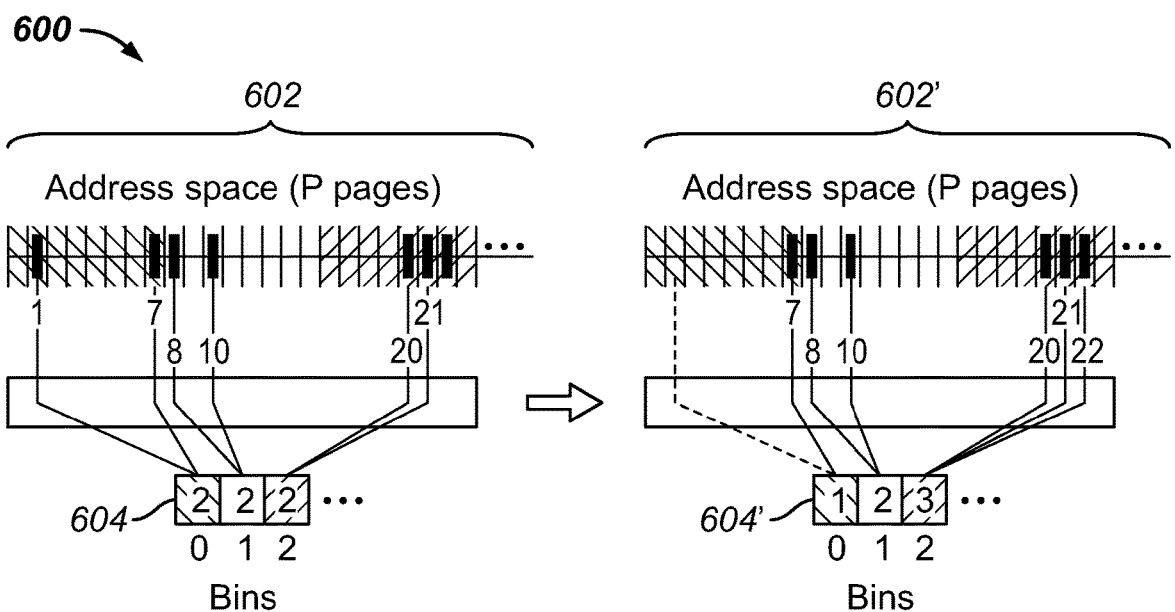

In FIG. 6A, a cache system (600) is shown to include a cache memory (650) and three incoming requests (616)-(620). FIG. 6B shows an address space (602) of the cache system (600) corresponding to the cache memory (650) of FIG. 6A. Accordingly, FIGS. 6A and 6B are discussed together below.

In FIGS. 6A and 6B, the incoming requests (616), (618) are requested cache misses and received by the cache memory (650) in the order of (616) and (618), with request (616) arriving first, followed by request (618). Each of the two incoming requests (616), (618) is associated with a page, "20" and "22", respectively. Pages "20" and "21" preexist in the cache memory (650). Prior to updating the bin counts based on the incoming requests (616) and (618), the state of the address space is shown at (602) and the state of the occupation count is occupation count (604) and in response to updating the bin counts based on the incoming requests, the state of the address space is shown at (602') and the state of the occupation count is occupation count (604').

Prior to updating the cache memory (650), the cache memory (650) is shown to include pages 1 and 7, corresponding to bin 0, pages 8 and 10, corresponding to bin 1, and pages 20 and 21, corresponding to bin 2. Accordingly, the occupation count for each of the bins 0, 1, and 2 is 2. After updating the cache memory (650), the cache memory includes page 22 and page 1 is evicted in accordance with a LRU rule. Because pages 20 and 21 preexist in the cache memory (650), they do not affect the occupation count of their corresponding bin. Accordingly, the occupation count (604') for bin 0 is updated to 1 due to the eviction of page 1, the occupation count (604') for bin 1 remains the same, and the occupation count (604') for bin 2 is updated to 3 to account for the addition of page 22 to the preexisting pages 20 and 21 in cache memory (650).

Figure 7A:
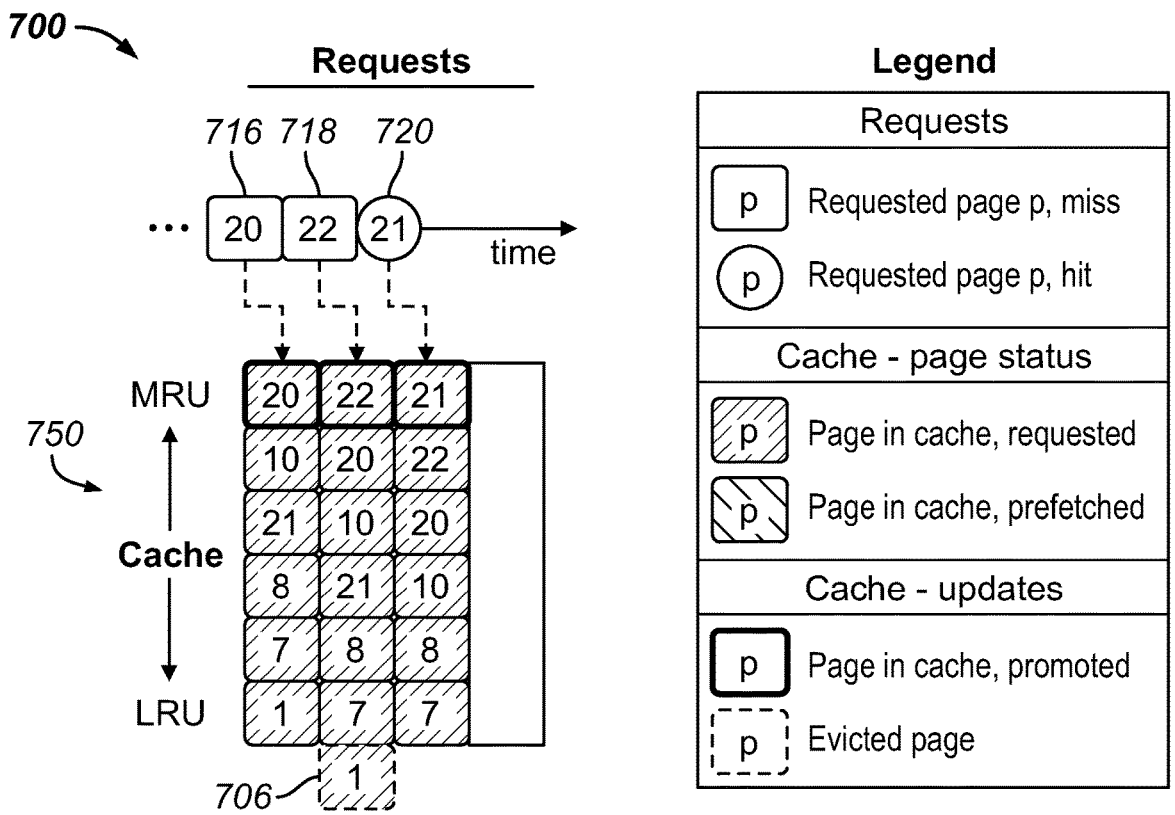
Figure 7B:
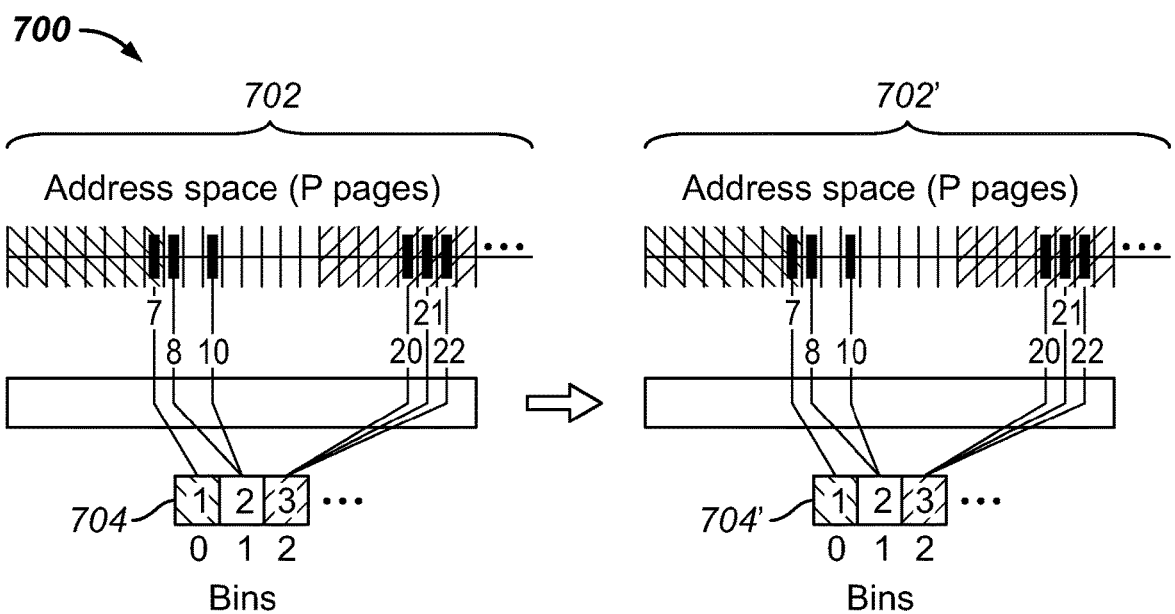

In FIG. 7A, a cache system (700) is shown to include a cache memory (750) and three incoming requests (716)-(720). FIG. 7B shows an address space (702) of the cache system (700) corresponding to the cache memory (750) of FIG. 7A. Accordingly, FIGS. 7A and 7B are discussed together below.

In FIGS. 7A and 7B, the three incoming requests (716)-(720) are received by the cache memory (750) in the order of (716), (718), and (720), with request (716) arriving first, followed by request (718), and followed by request (720). The requests (716) and (718) are request misses and the request (720) is a request hit. Each of the three incoming requests (716), (718), and (718) is associated with page "20", "22", and "21", respectively. The state of the address space prior to processing the requests is shown at (702) and the state of the address space after processing the requests is shown at (702'). Based on the state of the cache memory (750) prior to any updates, the occupation count (704) of bins 0, 1, and 2, corresponding to the page address ranges where each requested page resides, the occupation count (704) of the bins 0, 1, and 2 is 1, 2, and 3, respectively. Because of the preexistence of all three requests, the occupation count (704'), after updating, remains the same.

Figure 8A:
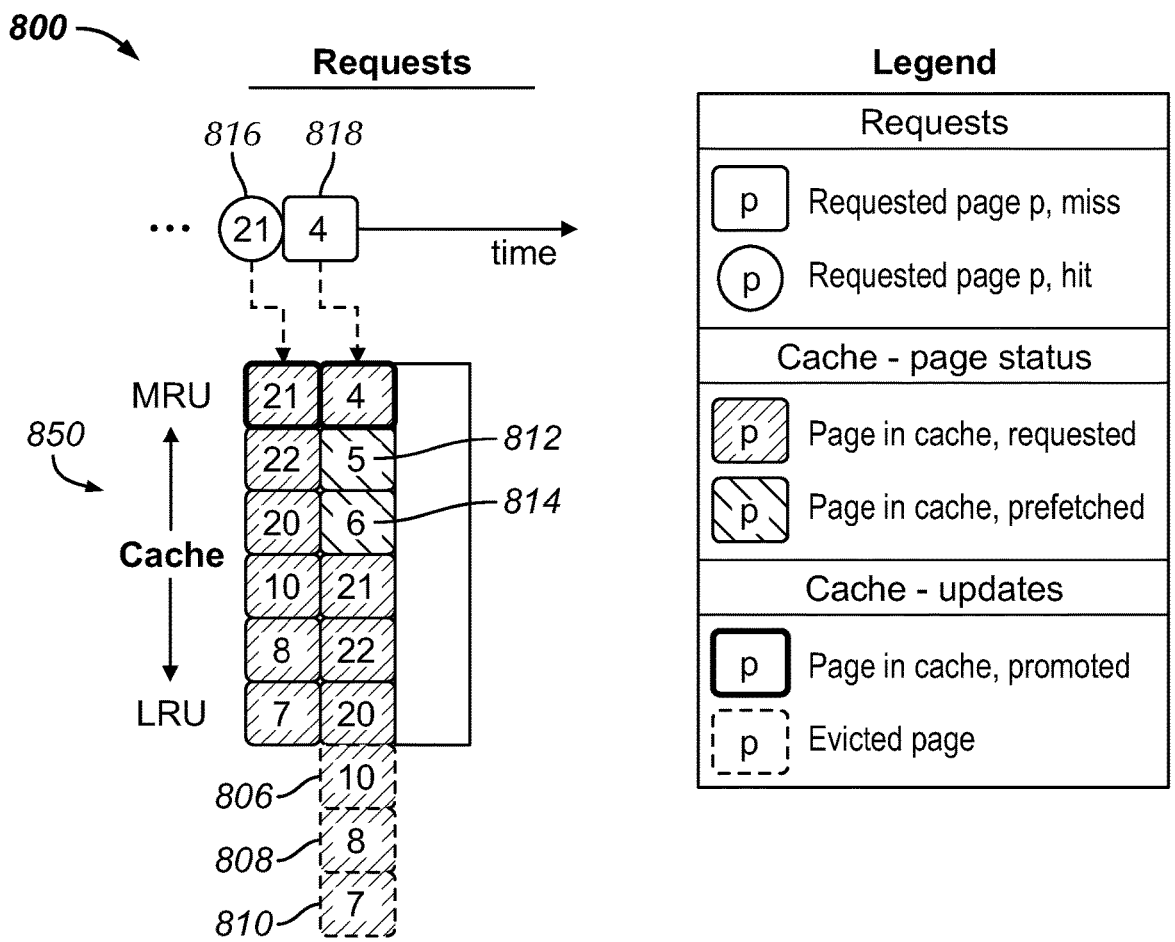
Figure 8B:
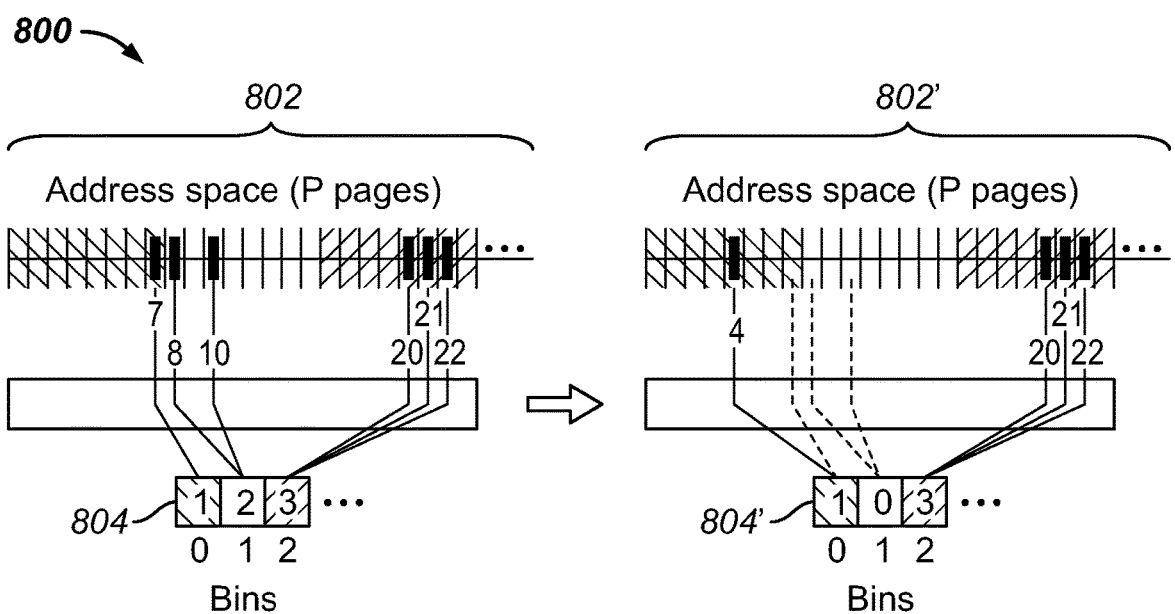

In FIG. 8A, a cache system (800) is shown to include a cache memory (850) and three incoming requests (816)-(820). FIG. 8B shows an address space (802) of the cache system (800) corresponding to the cache memory (850) of FIG. 8A. Accordingly, FIGS. 8A and 8B are discussed together below.

In FIGS. 8A-8B, two incoming requests, (816) and (818), are received by the cache memory (850) in the order of (816) and (816), with request (816) arriving first, followed by request (818). The request (816), for page 21, is for a requested page hit and the request (818), for page 4, is for a requested page, miss. The state of the address space prior to processing the requests is shown at (802) and the state of the address space after processing the requests is shown at (802'). Two sequentially neighboring pages to page 4, pages 5 and 6, are prefetched, and three pages, 10, 8, and 7 are evicted. Pages 4, 5, and 6 fall in bin 0 and given the prefetched nature of pages 5 and 6, the occupation count (804') of bin 0, after updating, remains the same as the occupation count (804) of bin 0 prior to updating, i.e., 1. With regard to bin 1, because two of its pages, pages 8 and 10, are evicted the occupation count (804'), after updating, is decremented by two relative to the occupation count (804) prior to the updating.

Figure 9A:
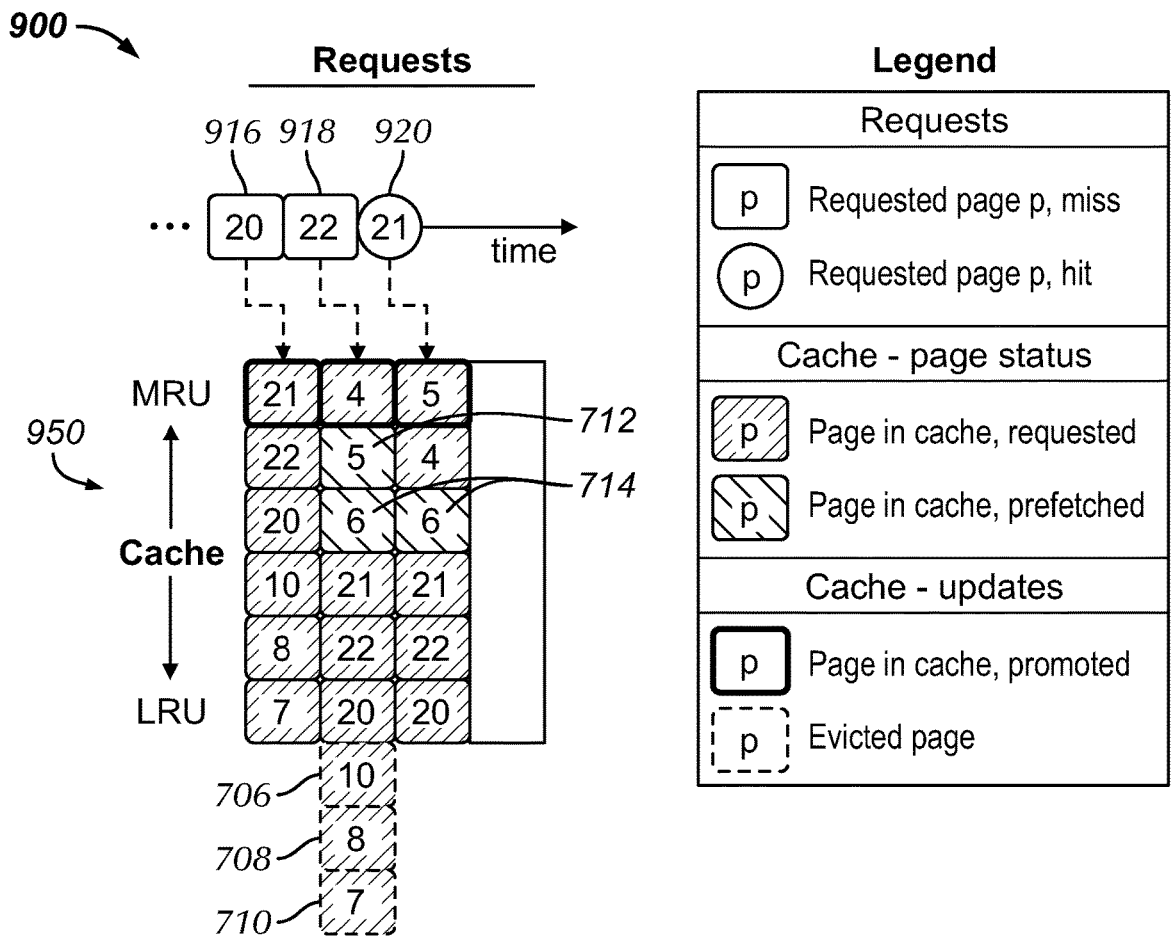
Figure 9B:
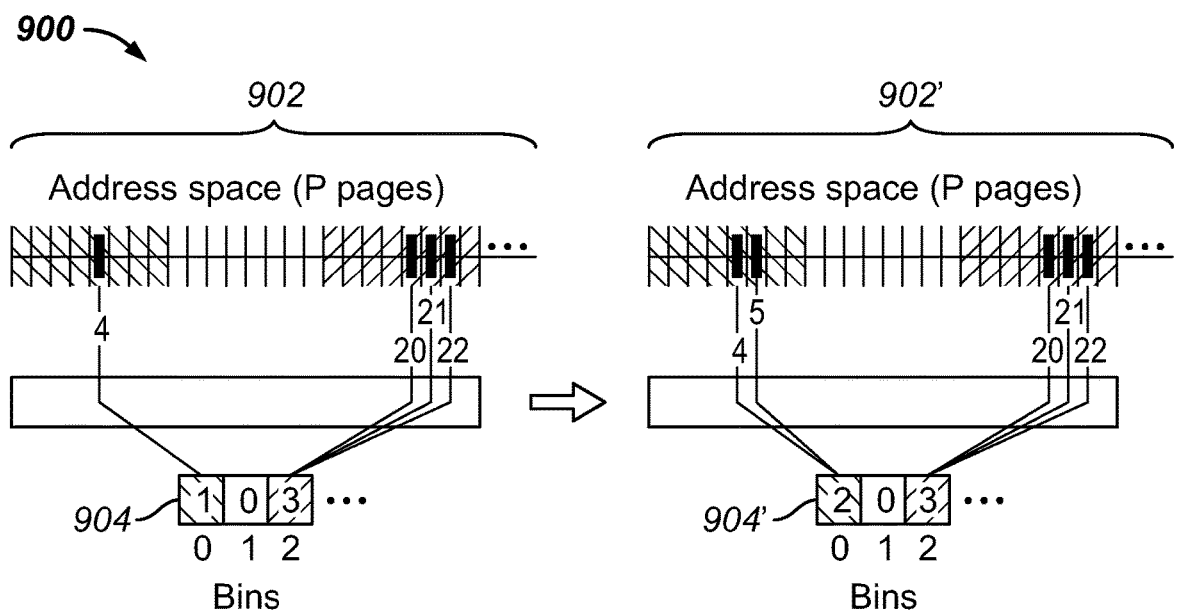

In FIG. 9A, a cache system (900) is shown to include a cache memory (950) and three incoming requests (916)-(920). FIG. 9B shows an address space (902) of the cache system (900) corresponding to the cache memory (950) of FIG. 9A. Accordingly, FIGS. 9A and 9B are discussed together below.

In FIGS. 9A and 9B, three incoming requests, (916)-(920), are received by the cache memory (950) in the order of (916), (918), and (920), with request (916) arriving first, followed by request (918), and followed by request (920). The state of the address space prior to processing the requests is shown at (902) and the state of the address space after processing the requests is shown at (902'). The request (916), for page 21, is for a requested page hit, the request (918), for page 4, is for a requested page miss, and the request (920), for page 5, is for a requested page hit. Two sequentially neighboring pages to page 4, pages 5 and 6, in addition to another instance of page 6 are prefetched, and three pages, 10, 8, and 7 are evicted. Page 4 does not preexist in the cache memory (950). Accordingly, the occupation count 904, pre-update, is 1, and because page 5, while prefetched, is the incoming request 920, the occupation count 904 is incremented by one upon dating. Page 5 will no longer be considered prefetched by the cache manager. The occupation count (904) for bin 1 remains the same, 0, after updating because the incoming request (916) for page 21 is a request for a preexisting page in the cache memory (950). Stated differently, page 21 was stored in the cache memory (950) prior to the arrival of incoming request (916). Similarly, the occupation count (904) for bin 2 remains the same, 3, after updating because page 21 of the request (916), preexists in the cache memory (950).

Figure 10A:
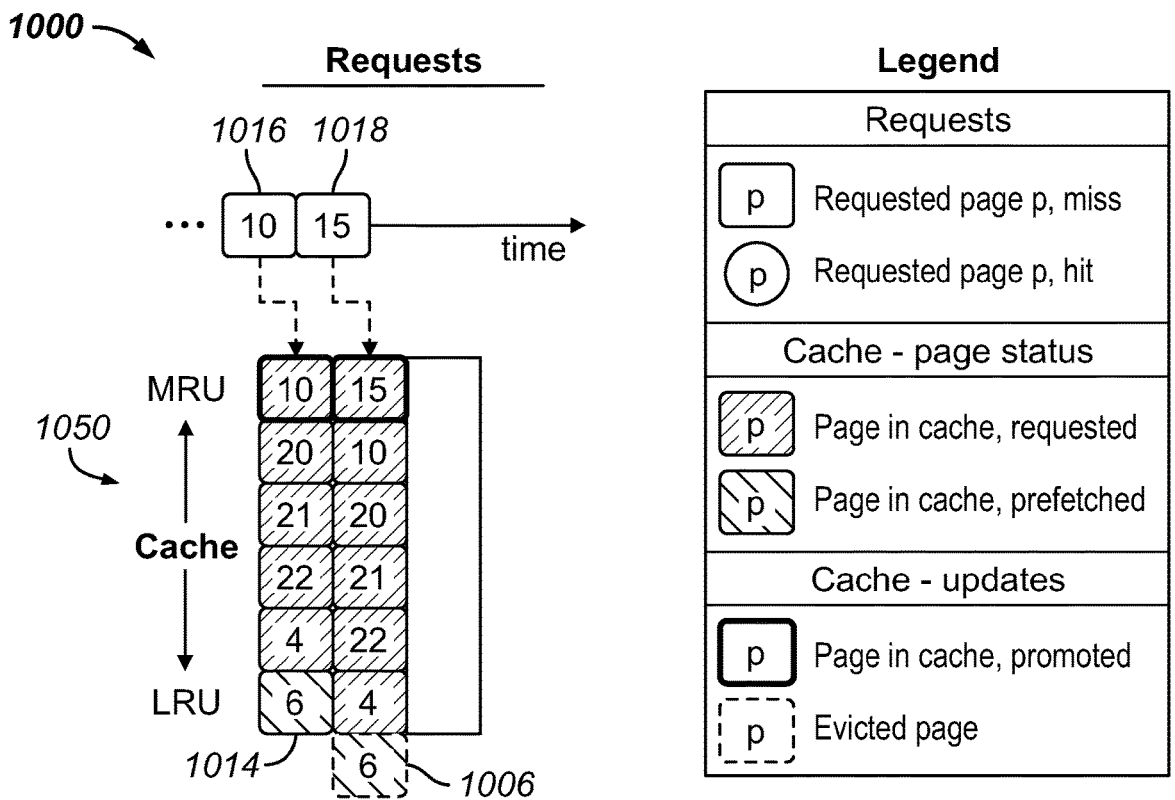
Figure 10B:
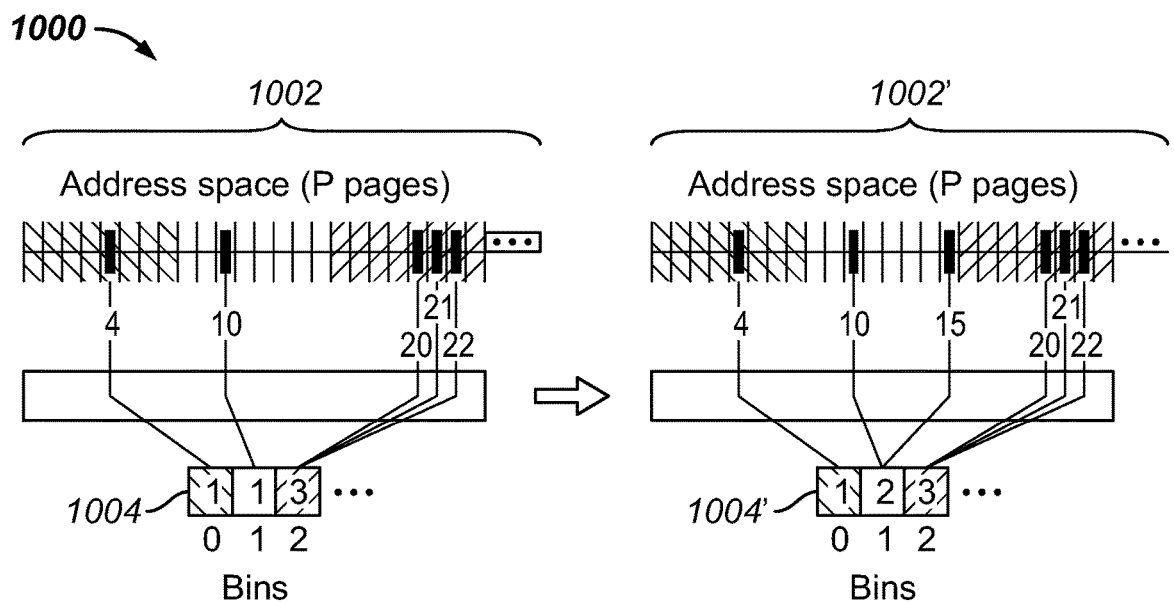

In FIG. 10A, a cache system (1000) is shown to include a cache memory (1050) and three incoming requests (1016)-(1020). FIG. 10B shows an address space (1002) of the cache system (1000) corresponding to the cache memory (1050) of FIG. 10A. Accordingly, FIGS. 10A and 10B are discussed together below.

In FIGS. 10A and 10B, two incoming requests, (1016) and (1018), are received by the cache memory 1050 in the order of (1016) and (1018), with request (1016) arriving first, followed by request (1018). The state of the address space prior to processing the requests is shown at (1002) and the state of the address space after processing the requests is shown at (1002'). The request (1016), for page 10, is for a requested page miss and the request (1018), for page 15, is also for a requested page miss. Page 6 was never requested and now being evicted from the cache memory (1050); accordingly, it does not affect the pre-update occupation count (1004). The occupation counts (1004') of bins 0, 1, 2, remain 1, 2, and 3, respectively.

Figure 11A:
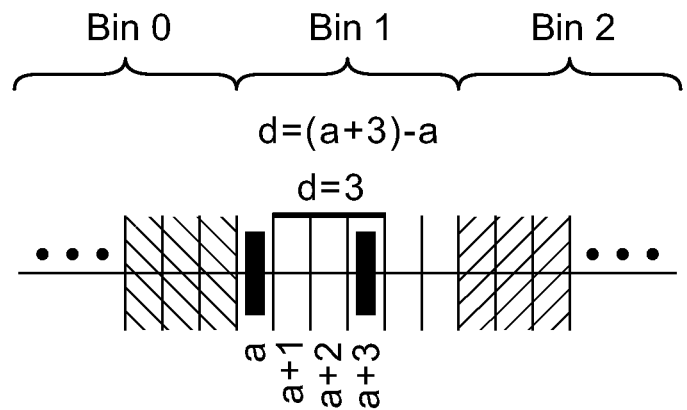
Figure 11B:
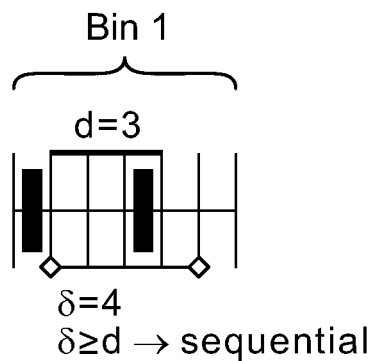
Figure 11C:
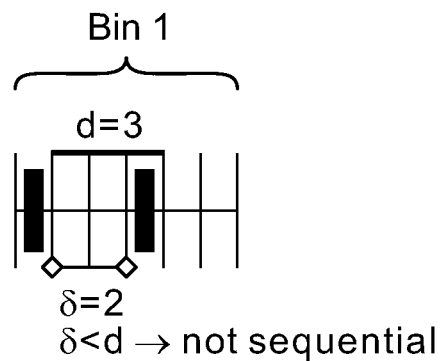

FIGS. 11A, 11B, and 11C show examples of the distance, d, and the gap δ, between two pages of an address space. In each figure, the request is for page "a" and for page "a+3" and each figure shows at least pages a, a+1, a+2, and a+3. In each figure, the distance between pages a and a+3 is three. That is, pages a+1 and a+2 reside between pages a and a+3. Accordingly, the distance, d, between pages a and a+3 is three.

In a non-limiting example, in cases where the maximum allowable gap, δ, is greater than or equal to "d", as shown in FIG. 11B, the workload is considered sequential, whereas, in cases where the δ is less than d, as shown in FIG. 11C, the workload is considered not sequential. The relation between distance and maximum allowed gap is therefore determinative of sequentiality. It is understood that d is not limited to 3 and the relation between d and δ may be different than the foregoing relation.

Various embodiments of the invention generalize the approach for cases where k>>δ. Locality assessment may be implemented in such scenarios, further described below, with minimal memory overheads and without additional significant computational overheads.

In accordance with an embodiment of the invention, a heuristic method of generating an estimate of the total number of expected proximal accesses is discussed below. In accordance with an embodiment of the invention, a computing device, such as one or more of the processors 1210 of FIG. 12 may implement generating an estimate of the total number of expected proximal accesses.

The core of the issue is that where a bin size k is much larger than the allowed gap δ, there is no guaranteed proximal access for each two pages within a bin's address range. This is similar to an inter-bin issue where the proximal accesses across adjacent bins is between two consecutive bins' address ranges. Accordingly, the heuristic method of various embodiments disclosed herein is to determine an expected number of proximal access given a fixed bin size k and a maximum allowed gap δ. Such a heuristic method for obtaining an expected number of proximal accesses within a bin of size k with an occupancy count c relies on a bin hash structure.

The bins hash structure theoretically maps each bin index ib to one integer value $0 < c \leq k$ where c is the number of pages requested in the address range from k·ib to k·(ib+1)−1. In practice, however, the bin hash structure will comprise a hash such that bins with a count of 0 are omitted thus minimizing the memory overhead because in typical settings most bins will be empty at any given time. Further, the time complexity for obtaining the count c of a bin ib is O(1).

Assuming a d-☐ it to be a proximal access in a distance of exactly d pages, i.e., two requests accessing pages that are exactly d pages apart in the address space, the difference between δ and d is as follows. While the δ parameter represents a maximum allowed gap, the actual distance d is an exact value. Therefore, the total number of proximal accesses is given by the sum of all d-☐ its for $1 \leq d \leq \delta$. Following this definition, for example, a 1-☐ it happens between two consecutive pages, e.g., pages 15 and 16. A 2-☐ it happens between pages 15 and 17, and so on. A d-☐ it can be represented by the smallest binary string representing present pages as ones and intermediate missing pages as zeroes. For example, a 1-☐ it can be represented by the string "11", a 2-☐ it by the string "101", and so on.

To recap, k is the number of pages in a bin, d is the order of the given hit (1-hit, 2-hit etc.), and c is the number of occupied pages. A function, H(k,c,d), is therefore defined such that it yields the total number of possible d-☐ its in a bin of size k with occupancy c as follows:

$$H(k,c,d) = \{(k-d) \cdot (k-(d+1)c-2), \text{ for } c \geq 2, d < k \quad \text{Eq. (1)}$$

The first term (k−d) of Eq. (1) yields the number of d-☐ its that are possible in a string of size k; and the second term of Eq. (1) is telling of the number of times the other occupied pages in the available slots outside the d-☐ it can be combined. This is defined as a d-☐ it k-substring. Intuitively, this means that in a string of size k, a substring of size d can start in the first positions, but not in the last d ones.

The second term (k−(d+1)c−2) of Eq. (1) comprises a combination. Consider first the simpler combination (k c). This gives the total number of possible configurations for a bin with k pages and c occupied pages. In the second term of function H, k−(d+1) instead of k in that combination is indicated. That is, the number of 'leftover' symbols in a d-☐ it k-substring, representing the other possible positions for pages in a bin's address range that contains a d-☐ it. For example, with d=2 and k=6, there are always three symbols leftover. These represent 'slots' in the bin's address range that other pages could occupy. Additionally, in the second term of function H, c−2 instead of c is indicated. This is because a d-☐ it is always comprised of exactly two pages. That is, the d-☐ it k-substring already makes use of 2 out of the c occupied pages. Hence, the second term of H represents the number of ways a d-☐ it can be fit into a bin of size k such that there are c pages occupying that bin. Theoretically, this is the number of d-☐ it k-substrings such that a total of c symbols are 1. The foregoing example demonstrates the number of ways the first configuration of a 2-☐ it can be fit into a bin of size k=6 when the occupancy c=4.

The multiplication of the first factor (the number of possible distinct d-hits) by the second factor of H yields the total number of possible d-☐ its in a bin of size k with occupancy c. The foregoing example can be extended to represent the results of the function H(6,4,2), where Πc,k is the set of all k-substrings with c occupied pages. The set of all d-☐ it k-substrings for a value of c is a proper subset of Πc,k.

Accordingly, first, the function H is not defined for values of c<2 for some embodiments of the invention. This is not an issue given the goal of using the d-☐ its to compute the number of proximal accesses—and, pursuant to the above inter-bin discussion, the number of proximal accesses in a bin's address range is zero. Second, the function H is also not defined for values of d≥k. This is intuitively explained because the relevant values for d are 1, . . . , δ.

As noted above, the total number of proximal accesses is given by the sum of all d-☐ its for $1 \leq d \leq \delta$. With the function H at hand, a function G can be defined that provides the total number of proximal accesses for a bin of size k, with occupancy c, and a maximum allowed gap of δ, as follows:

$$G(k, c, \delta) = \sum_{d=1}^{\delta} H(k, c, d). \quad \text{Eq. (2)}$$

$$(x + a)^n == G(k, c, \delta) = \sum_{d=1}^{\delta} H(k, c, d).$$

The computation of function H(k,c,d)=(k−d)·(k−(d+1)c−2) involves the calculation of combinations, i.e. (k−(d+1)c−2). The calculation of a binomial coefficient (XY) can be performed in O(X), due to the implicit factorial calculation. Therefore, H(k,c,d) is O(k) in the worst case (since d<k) and the computational complexity of G is O(k·δ). In practice, with values of k bound to reasonable values (e.g., 128 to 512), this comprises a reasonably small computational overhead for a single computation.

However, given that this computation might take place for every request in an data stream, precomputing relevant values G and storing them in a heuristics table for use in assessing sequentiality may be implemented, as follows.

Assuming each bin of an addressable space to have a uniform distribution of stored pages (i.e., all bin occupancy configurations are equally likely), the following equation for expected proximal accesses, EP, over the entire address space holds:

$$EP[F(k,c,\delta,\pi)] = \Sigma P(\pi) F(k,c,\delta,\pi) \pi \in \Pi c, k, \quad \text{Eq. (3)}.$$

where "Πc,k" is the countable set of all configurations that have k pages and c occupied pages; and $F(k,c,\delta,\pi)$ is a function that provides the number of hits for a specific configuration $\pi \in \Pi c,k$, where "∈" represents a set. Assuming $P(\pi)=(kc)-1$ to be a uniform distribution over all configurations, it stands to reason that the function for an approximate or expected number of proximate accesses may be represented by EP as follows:

$$EP[F(k,c,\delta,\pi)] = \Sigma(kc) - 1\pi \in \Pi c, kF(k,c,\delta,\pi) = (kc) - 1\Sigma F(k,c,\delta,\pi)\pi \in \Pi c, k \qquad \text{Eq. (4)}.$$

Setting $\Sigma F(k,c,\delta,\pi)\pi \in \Pi c,k = G(k,c,\delta)$, where "$G(k,c,\delta)$" represents the possible values of the expected proximal accesses. Accordingly, EP can be reduced to the following relationship:

$$EP[F(k,c,\delta,\pi)] = G(k,c,\delta)(kc). \qquad \text{Eq. (5)}$$

The heuristic table may be derived based on the function EP of Eq. (5) for each bin to determine a real-time sequentiality assessment. In some embodiments, a predetermined threshold may be compared to the function EP of the heuristics table to assess sequentiality. Alternatively, a predetermined threshold may be compared to the proximal accesses of the heuristics table to determine a real-time sequentiality assessment on a bin basis.

Eq. (5) assumes the values of k and $\delta$ are fixed and there are k possible values of occupation count, c. Accordingly, a heuristics table, of all possible values of k may be stored, as discussed above. The same holds for the possible values of $G(k,c,\delta)-k$ (one for each value of c) can be precomputed for possible values of G.

The expected number of proximal accesses according to Eq. (5) is a fairly conservative estimation of the expected proximal accesses because an assumption is made of the total randomness of bin occupation. Assuming total sequentiality, the upper bound of proximal accesses, which is simply c−1 applies.

Figure 12:
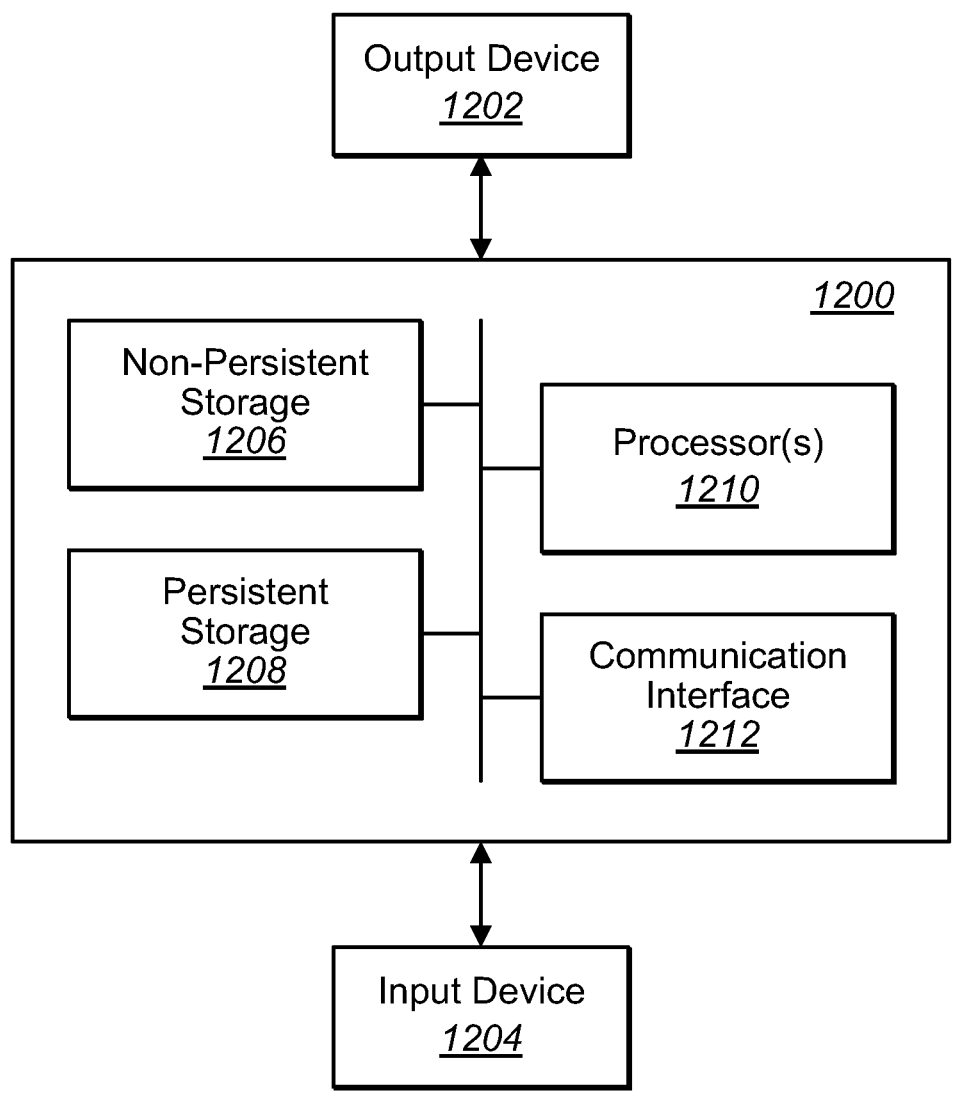
FIG. 12 shows an example computing device in accordance with one or more embodiments described herein.

As discussed above, embodiments of the invention may be implemented using computing devices. FIG. 12 shows a diagram of a computing device in accordance with one or more embodiments of the invention. The computing device (1200) may implement an embodiment of a cache manager (e.g., 120, in FIG. 1). The computing device (1200) may include one or more computer processors (1210), non-persistent storage (1206) (e.g., volatile memory, such as random access memory (RAM), cache memory), persistent storage (1208) (e.g., a hard disk, an optical drive such as a compact disk (CD) drive or digital versatile disk (DVD) drive, a flash memory, etc.), a communication interface (1212) (e.g., Bluetooth® interface, infrared interface, network interface, optical interface, etc.), input devices (1204), output devices (1202), and numerous other elements (not shown) and functionalities. Each of the components illustrated in FIG. 12 is described below.

In one embodiment of the invention, the computer processor(s) (1210) may be an integrated circuit for processing instructions. For example, the computer processor(s) may be one or more cores or micro-cores of a processor. The computing device (1200) may also include one or more input devices (1204), such as a touchscreen, keyboard, mouse, microphone, touchpad, electronic pen, or any other type of input device. Further, the communication interface (1212) may include an integrated circuit for connecting the computing device (1200) to a network (not shown) (e.g., a local area network (LAN), a wide area network (WAN) such as the Internet, mobile network, or any other type of network) and/or to another device, such as another computing device.

In one embodiment of the invention, the computing device (1200) may include one or more output devices (1202), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1210), non-persistent storage (1206), and persistent storage (1208). Many different types of computing devices exist, and the aforementioned input and output device(s) may take other forms.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of assessing sequentiality of a data stream, the method comprising:
    receiving an incoming request to access a page in a cache memory, wherein the page is identified by a page address of an address space in a main memory;
    identifying, in a memory, a bin corresponding to an address range including the page address of the page of the incoming request, wherein the bin includes k address ranges of the address space of the main memory;
    determining whether to update an occupation count of the bin in the memory;
    locating the bin in a heuristics table to obtain an estimated total number of expected proximal accesses based on an updated occupation count of the bin; and
    determining, based on the estimated total number of expected proximal accesses, sequentiality of the data stream to device in order to generate a policy for the cache memory.

2. The method of claim 1, wherein determining whether to update the occupation count of the bin comprises:
    determining whether the page preexists in the cache memory;
    in response to determining the page does not preexist in the cache memory, determining whether the incoming request causes one or more prefetched pages in the cache memory;
    in response to determining the incoming request does not cause prefetched pages in the cache memory, determining whether one or more evicted pages are associated with the incoming request; and
    in response to determining one or more evicted pages are associated with the incoming request, decrementing the occupation count of the bin and occupation counts corresponding to each of a remaining evicted pages of the evicted pages.

3. The method of claim 1, wherein determining whether to update the occupation count of the bin further comprising:
    determining whether the page preexists in the cache memory;
    in response to determining the page preexists in the cache memory, avoiding incrementing the occupation count of the bin; and
    in response to determining the page does not preexist in the cache memory, incrementing the occupation count of the bin.

4. The method of claim 1, wherein determining whether to update the occupation count of the bin further comprising:
    determining whether the page preexists in the cache memory;
    in response to determining the page does not preexist in the cache memory, determining whether the incoming request causes one or more prefetched pages in the cache memory;
    in response to determining the incoming request causes the prefetched pages in the cache memory, avoiding incrementing the occupation count of the bin and occupation counts corresponding to each of a remaining prefetched pages of the prefetched pages associated with the page of the incoming request; and
    in response to determining the incoming request does not cause the prefetched pages in the cache memory, incrementing the occupation count of the bin.

5. The method of claim 1, wherein determining whether to update the occupation count of the bin further comprising:
    determining whether the page preexists in the cache memory;
    in response to determining the page does not preexist in the cache memory, determining whether the incoming request causes one or more prefetched pages in the cache memory;
    in response to determining the incoming request does not cause prefetched pages in the cache memory, determining whether one or more evicted pages are associated with the incoming request;
    in response to determining the evicted pages are associated with the incoming request, avoiding decrementing the occupation count of the bin and occupation counts corresponding to each of a remaining evicted pages of the evicted pages; and
    in response to determining no evicted pages are associated with the incoming request, avoiding decrementing the occupation count of the bin.

6. The method of claim 1, wherein the memory with the bin resides in the cache memory.

7. The method of claim 1, wherein the memory with the bin resides externally to the cache memory.

8. The method of claim 1, further comprising:
    generating the heuristics table prior to receiving the incoming request.

9. The method of claim 1, wherein the policy is a cache management policy or a cache optimization policy.

10. The method of claim 9, wherein the policy is a prefetch policy or a promotion policy.

11. A device, comprising:
    a processor; and
        memory comprising instructions which, when executed by the processor, perform assessing sequentiality of a data stream, the method comprising:
        receiving an incoming request to access a page in a cache memory, wherein the page is identified by a page address of an address space in a main memory;
        identifying, in a memory, a bin corresponding to an address range including the page address of the page of the incoming request, wherein the bin includes k address ranges of the address space of the main memory;
        determining whether to update an occupation count of the bin in the memory;
        locating the bin in a heuristics table to obtain an estimated total number of expected proximal accesses based on an updated occupation count of the bin; and
        determining, based on the estimated total number of expected proximal accesses, sequentiality of the data stream to device in order to generate a policy for the cache memory.

12. The device of claim 11, wherein determining whether to update the occupation count of the bin comprises:
    determining whether the page preexists in the cache memory;
    in response to determining the page does not preexist in the cache memory, determining whether the incoming request causes one or more prefetched pages in the cache memory;
    in response to determining the incoming request does not cause prefetched pages in the cache memory, determining whether one or more evicted pages are associated with the incoming request; and in response to determining one or more evicted pages are associated with the incoming request, decrementing the occupation count of the bin and occupation counts corresponding to each of a remaining evicted pages of the evicted pages.

13. The device of claim 11, wherein determining whether to update the occupation count of the bin further comprising:
    determining whether the page preexists in the cache memory;
    in response to determining the page preexists in the cache memory, avoiding incrementing the occupation count of the bin; and
    in response to determining the page does not preexist in the cache memory, incrementing the occupation count of the bin.

14. The device of claim 11, wherein determining whether to update the occupation count of the bin further comprising:
    determining whether the page preexists in the cache memory;
    in response to determining the page does not preexist in the cache memory, determining whether the incoming request causes one or more prefetched pages in the cache memory;
    in response to determining the incoming request causes the prefetched pages in the cache memory, avoiding incrementing the occupation count of the bin and occupation counts corresponding to each of a remaining prefetched pages of the prefetched pages associated with the page of the incoming request; and
    in response to determining the incoming request does not cause the prefetched pages in the cache memory, incrementing the occupation count of the bin.

15. The device of claim 11, wherein determining whether to update the occupation count of the bin further comprising:
    determining whether the page preexists in the cache memory;
    in response to determining the page does not preexist in the cache memory, determining whether the incoming request causes one or more prefetched pages in the cache memory;
    in response to determining the incoming request does not cause prefetched pages in the cache memory, determining whether one or more evicted pages are associated with the incoming request;
    in response to determining the evicted pages are associated with the incoming request, avoiding decrementing the occupation count of the bin and occupation counts corresponding to each of a remaining evicted pages of the evicted pages; and
    in response to determining no evicted pages are associated with the incoming request, avoiding decrementing the occupation count of the bin.

16. The device of claim 11, wherein the memory with the bin resides in the cache memory.

17. The device of claim 11, wherein the memory with the bin resides externally to the cache memory.

18. The device of claim 11, further comprising:
    generating the heuristics table prior to receiving the incoming request.

19. The device of claim 11, wherein the policy is a cache management policy or a cache optimization policy.

20. A non-transitory computer readable medium comprising computer readable program code, which when executed by a computer processor enables the computer processor to perform a method for assessing sequentiality of a data stream, the method comprising:
    receiving an incoming request to access a page in a cache memory, wherein the page is identified by a page address of an address space in a main memory;
    identifying, in a memory, a bin corresponding to an address range including the page address of the page of the incoming request, wherein the bin includes k address ranges of the address space of the main memory;
    determining whether to update an occupation count of the bin in the memory;
    locating the bin in a heuristics table to obtain an estimated total number of expected proximal accesses based on an updated occupation count of the bin; and
    determining, based on the estimated total number of expected proximal accesses, sequentiality of the data stream to device in order to generate a policy for the cache memory.

* * * * *